United States Patent
Neige et al.

(10) Patent No.: US 11,731,171 B2
(45) Date of Patent: Aug. 22, 2023

(54) SYSTEMS AND METHODS FOR SPECTRAL IDENTIFICATION AND OPTICAL SORTING OF MATERIALS

(71) Applicant: 6511660 CANADA INC., Sherbrooke (CA)

(72) Inventors: Julien Neige, Sherbrooke (CA); Nathanaël Lortie, Sherbrooke (CA); Alain Brasseur, Sherbrooke (CA)

(73) Assignee: 6511660 CANADA INC., Sherbrooke (CA)

( * ) Notice: Subject to any disclaimer, the term of this patent is extended or adjusted under 35 U.S.C. 154(b) by 691 days.

(21) Appl. No.: 16/611,992

(22) PCT Filed: May 9, 2018

(86) PCT No.: PCT/CA2018/050552
§ 371 (c)(1),
(2) Date: Nov. 8, 2019

(87) PCT Pub. No.: WO2018/205026
PCT Pub. Date: Nov. 15, 2018

(65) Prior Publication Data
US 2020/0197981 A1   Jun. 25, 2020

Related U.S. Application Data

(60) Provisional application No. 62/504,899, filed on May 11, 2017.

(51) Int. Cl.
*B07C 5/342* (2006.01)
*G01J 3/02* (2006.01)
(Continued)

(52) U.S. Cl.
CPC ............ *B07C 5/342* (2013.01); *G01J 3/0208* (2013.01); *G01J 3/108* (2013.01); *G01J 3/42* (2013.01)

(58) Field of Classification Search
CPC ......... B07C 5/342; G01J 3/0208; G01J 3/108; G01J 3/42; G01J 5/53; Y02W 30/62; G01N 21/3563
(Continued)

(56) References Cited

U.S. PATENT DOCUMENTS 6,610,953 B1    8/2003  Tao et al.
6,646,218 B1   11/2003  Campbell et al.
(Continued)

FOREIGN PATENT DOCUMENTS

EP      1698888 A2    9/2006
WO   2010073004 A1    7/2010
(Continued)

OTHER PUBLICATIONS

Tomra Sorting Solutions, 2015. "Autosort Flake: Advanced Sensor-Based Sorting Technology for Optimized Results", Brochure, 6pp.
(Continued)

*Primary Examiner* — Md M Rahman
(74) *Attorney, Agent, or Firm* — Crowell & Moring LLP

(57) ABSTRACT

Spectral identification and optical sorting systems and methods are disclosed. The system can include a conveying roller having a conveying surface on its outer lateral periphery along which a flow of objects can be transported; an illumination unit to illuminate the objects on the conveying surface; a spectral detector to detect object light from the objects and output spectral data; and a processor to derive, from the measured spectral data, material-specific information associated with the objects. A sorting unit can be provided to sort the objects based on the material-specific information. An infrared emitter-detector assembly for measuring a mid-wavelength infrared (MWIR) response of an object is also disclosed and includes an illumination unit having a blackbody-like source operated at a temperature of
(Continued)

about at least 2000 kelvins; and a MWIR detector having a detection waveband including wavelengths between about 2.5 and 8 micrometers to detect object light from the object.

97 Claims, 13 Drawing Sheets

(51) Int. Cl.
  *G01J 3/10* (2006.01)
  *G01J 3/42* (2006.01)
(58) Field of Classification Search
  USPC .......................................................... 356/300
  See application file for complete search history.

(56) References Cited

U.S. PATENT DOCUMENTS

| | | | |
|---|---|---|---|
| 7,119,337 | B1 | 10/2006 | Johnson et al. |
| 7,968,848 | B2 | 6/2011 | Johnson et al. |
| 8,716,651 | B2 | 5/2014 | De Ruyter |
| 9,494,469 | B2 | 11/2016 | Yon et al. |
| 2003/0111202 | A1* | 6/2003 | Sparks ...................... B22C 5/18 164/412 |
| 2008/0024778 | A1 | 1/2008 | Honda et al. |
| 2014/0014762 | A1* | 1/2014 | Ichinomiya ............ B65H 27/00 242/520 |
| 2017/0045436 | A1* | 2/2017 | Fox ......................... G01J 3/027 |

FOREIGN PATENT DOCUMENTS

| | | |
|---|---|---|
| WO | 2013001303 A1 | 1/2013 |
| WO | 2013117769 A1 | 8/2013 |
| WO | 2015063299 A1 | 5/2015 |
| WO | 20015063300 A1 | 5/2015 |

OTHER PUBLICATIONS

EVK DI Kerschhaggl GmbH et al., 2010-2013. "Black Polymer Sorting". Layman's Report #ECO/09/256154, p. 1-5.
Helios Quartz, 2016. "Quartz Infrated Heaters, IR Technology: Heating by Radiation". https://www.heliosquartz.com/prodotti/ir-techonology-heating-by-radiation/?lang=en [Consulted online].
IBT.InfraBioTech GmbH, 2014. "KIR-Line". https://www.infrabiotech.de/en/products/infrared-heater.html [Consulted on Mar. 21, 2017].
IBT.InfraBioTech GmbH, 2014. "STIR-Line". https://www.infrabiotech.de/en/products/infrared-heater.html [Consulted on Mar. 21, 2017].
Kanthal, 2012. "Electric Heating elements ; Products and accessories", https://www.kanthal.com/globalassets/kanthal-global/downloads/furnace-products-and-heating-systems/heating-elements/mosi2-heating-elements/s-ka058-b-eng-2012-01.pdf [Online Brochure].
Perkinelmer, Inc. 2011. "PerkinElmer Frontier; FT-IR, NIR and FIR Spectroscopy". PerkinElmer Brochure, 20pp.
Dube, William, Apr. 2009. "Reasearch at RIT : A research lab at Rochester Institute of Technology advances technologies for remote sensing and hyperspectral imaging". SPIE, The International Society for Optics and Photonics, https://spie.org/news/spie-professional-magazine/2009-april/rit-remote-sensing?SSO=1 [Consulted on Nov. 28, 2019].
Buhler Sortex Limited, 2016. "Plastic optical sorting solutions". Brochure, 16 pp.
Watlow. 1997. "Radiant Heating Wth Infrared ; A Technical Guide to Understanding and Applying Infrared Heaters", Brochure, 39pp.
Steinert S. 2014. "UniSort Flake with NIR or Colour Sorting in Fine-Grain Materials", https://steinertglobal.com/fileadmin/user_upload/_steinert/_downloads/_magnete-sensorsortierer/_sensorsortierung/UniSort_Flake/STE_Flakesorter_EN.pdf [Online Brochure].
Steinert S. 2016. "UniSort BlackEye—A World Firts in the Reognition and Sorting of Black Plastics". https://steinertglobal.com/fileadmin/user_upload/_steinert/_downloads/_magnete-sensorsortierer/_sensorsortierung/UniSort_BlackEye/STE_UNI_blackeye_EN.pdf [Online Brochure].

* cited by examiner

SYSTEMS AND METHODS FOR SPECTRAL IDENTIFICATION AND OPTICAL SORTING OF MATERIALS

RELATED PATENT APPLICATION

The present application claims priority from U.S. Provisional Patent Application No. 62/504,899 filed on May 11, 2017, the disclosure of which is incorporated herein by reference in its entirety.

TECHNICAL FIELD

The technical field generally relates to optical spectral analysis systems and methods, and more particularly to optical spectral analysis systems and methods for use in spectral identification and/or optical sorting of materials, for example in infrared spectral identification and sorting of plastic materials.

BACKGROUND

Systems and methods for optically identifying and/or sorting materials, such as plastics and ceramics, are used in various fields of applications, for example in the waste treatment and recycling industry. To be economically viable, optical sorting systems and methods generally should be able to process a high volume of materials, while providing a sufficiently precise and reliable spectral analysis of the processed materials to ensure proper identification and sorting. Commercially available optical sorting systems include systems in which particles to be sorted are spectrally analyzed while they are conveyed on a belt conveyor, and systems in which particles to be sorted are spectrally analyzed as they are freefalling from a particle feeder (e.g., an inclined plane or a chute). Such systems have several drawbacks and limitations, for example in terms of measurement precision, overall process speed, and control of particle speed and/or orientation. Various challenges therefore remain in the field of spectral identification and optical sorting of materials.

SUMMARY

The present description generally relates to systems and methods for material identification and/or sorting using spectral imaging. Some of the present techniques can be particularly useful in the context of identifying and/or sorting materials using infrared spectroscopy, for example plastic materials.

In some implementations, the present techniques can be applied to or implemented in optical spectral analysis systems and methods that involve identifying materials by measuring and analyzing a spectral feature or signature of the materials. Such implementations can be referred to as "spectral identification implementations". In other implementations, the present techniques can be applied to or implemented in optical sorting systems and methods that involve sorting materials by measuring and analyzing a spectral feature or signature of the materials, and separating, grouping or classifying the materials based on the spectral analysis. Such implementations can be referred to as "optical sorting implementations".

In accordance with an aspect, there is provided a spectral identification system for spectrally analyzing a flow of objects, including:

- a conveying roller having a longitudinal rotation axis and an outer lateral periphery, the outer lateral periphery defining a conveying surface to support and transport the objects along a conveying path extending from a feed end to a discharge end thereof;
- an illumination unit configured to project illumination light toward an illumination zone intersecting at least part of the conveying path to illuminate the flow of objects on the conveying surface;
- a spectral detection unit configured to detect object light emanating from the flow of objects in the illumination zone upon illumination by the illumination light and output spectral data representative of the detected object light; and
- a processing unit configured to receive the spectral data output by the spectral detection unit and perform material identification in the flow of objects based on the spectral data.

In some implementations, the conveying roller has a cylindrical shape and is rotatably mounted to a support frame. In such scenarios, the outer lateral periphery that defines the conveying surface along which the objects are transported corresponds to the outer circumferential surface of the cylinder. In some implementations, the cylindrical conveying roller has a length ranging between about 100 millimeters (mm) and about 1500 millimeters and a diameter ranging between about 100 millimeters and about 350 millimeters. In some implementations, the conveying roller is made of polytetrafluoroethylene (PTFE), polyether ether ketone (PEEK), ultra-high-molecular-weight polyethylene (UHMW-PE), aluminum, or steel. In some implementations, the outer lateral periphery has a surface normal that is everywhere perpendicular to the longitudinal rotation axis. In some implementations, the objects are discharged from the conveying roller by gravity at the discharge end of the conveying path.

In some implementations, the illumination light emitted by the illumination unit can have a spectrum encompassing an illuminating waveband that lies in the infrared range of the electromagnetic spectrum. In such implementations, the object light emanating from the flow of objects probed by the illumination light is representative of the infrared spectral response or signature of the various flowing objects. For example, the illuminating waveband can encompass at least partially one of more of the near infrared (NIR; 0.75-1.4 µm), the short-wavelength (SWIR; 1.4-2.5 µm or 1.4-3 µm), the mid-wavelength infrared (MWIR; 2.5-8 µm or 3-8 µm) and the long-wavelength infrared (LWIR; 8-15 µm) regions of the infrared range of the electromagnetic spectrum. In other implementations, the illuminating waveband can lie outside the infrared region, for example in one among the millimeter, terahertz, visible, ultraviolet and x-ray regions.

In some implementations, the illumination unit is configured to emit the illumination light in an illumination waveband including wavelengths ranging from about 0.2 micrometer (µm) to about 15 micrometers; or ranging from about 0.4 micrometer to about 0.7 micrometer; or ranging from about 0.9 micrometer to about 1.7 micrometers or ranging from about 1.3 micrometers to about 1.9 micrometers; or ranging from about 3 micrometers to about 8 micrometers.

In some implementations, the illumination unit includes a blackbody-like source having an operating temperature of at least about 2000 kelvins (K), the illumination unit being configured to emit illumination light upon the object in the illumination zone, the illumination light including wavelengths lying in an illumination waveband ranging from about 3 micrometers to about 8 micrometers. In such implementations, the illumination unit can include a cladding surrounding at least partly the blackbody-like source. For example, the cladding can be made of quartz. In some implementations, the cladding is in thermal contact with and heated by the blackbody-like source to emit cladding light including wavelengths lying in at least part of the illumination waveband and forming part of the illumination light. Furthermore, the cladding can be a hermetically sealed cavity around the blackbody-like source, the hermetically sealed cavity containing a fill gas including a halogen. In such implementations, the blackbody-like source can be a heatable filament, for example made of tungsten. In some implementations, the operating temperature of the blackbody-like source ranges between about 2000 kelvins and about 3500 kelvins. In some implementations, the illumination unit includes an optical reflector, such as an elliptical reflector, positioned to receive and reflect the illumination light toward the object. For example, the elliptical reflector can have a primary focus substantially coincident with the blackbody-like source and a second focus substantially coincident with the illumination zone.

In some implementations, the illumination unit includes a single optical source, while in other implementations, the illumination unit includes a plurality of optical sources, each optical source producing a respective portion of the illumination light. Depending on the applications, the illumination unit can include different types of optical sources, for example a solid-state optical source, an incandescent optical source (e.g., a halogen optical source), a fluorescent optical source, a discharge optical source, or a combination thereof.

In some implementations, the spectral detection unit includes at least one of a hyperspectral imager and a multispectral imager.

In some implementations, the spectral detection unit includes a detector configured to detect the object light in a detection waveband ranging from about 0.2 micrometer to about 15 micrometers; or ranging from about 0.4 micrometer to about 0.7 micrometer; or ranging from about 0.9 micrometer to about 1.7 micrometers; or ranging from about 1.3 micrometers to about 1.9 micrometers; or ranging from about 3 micrometers to about 8 micrometers.

Depending on the application, the spectral detection unit can be configured to detect the object light as specularly reflected light produced by specular reflection of the illumination light from the objects and/or as diffusively reflected light produced by diffuse reflection of the illumination light from the objects.

In some implementations, the spectral detection unit and the processing unit are combined into a single-unit device. For example, in some variants, the spectral detection unit and the processing unit can be part of a spectral imager, for example an infrared-sensitive spectral camera. However, in other implementations, the spectral detection unit and the processing unit are provided into two independent but interconnected devices.

In some implementations, the conveying roller has a hollow interior defining a cavity sized and shaped to accommodate therein at least one of the illumination unit and the spectral detection unit. For example, the illumination unit and spectral detection unit can be provided respectively inside and outside the conveying roller. In such a case, the spectral detection unit is configured to detect the object light as transmitted light produced by transmission of the illumination light through the flow of objects and the conveying surface.

In some implementations, the spectral identification system can further include an input feeder located at or proximate the feed end of the conveying path to supply the flow of objects to the conveying surface. That is, the input feeder is configured to feed the conveying surface of the rotatable conveying roller with the objects to be analyzed. For example, the input feeder can be a vibrating table.

In accordance with another aspect, there is provided an optical sorting system for optically sorting a flow of objects, the optical sorting system including a spectral identification system as described herein; and a sorting unit configured to sort the objects discharged from the conveying roller end based on the material identification data received from the processing unit. That is, in addition to the sorting unit, the optical sorting system can include a conveying roller having a longitudinal rotation axis and an outer lateral periphery, the outer lateral periphery defining a conveying surface to support and transport the objects along a conveying path extending from a feed end to a discharge end thereof; an illumination unit configured to project illumination light toward an illumination zone intersecting at least part of the conveying path to illuminate the flow of objects on the conveying surface; a spectral detection unit configured to detect object light emanating from the flow of objects in the illumination zone upon illumination by the illumination light and output spectral data representative of the detected object light; and a processing unit configured to receive the spectral data output by the spectral detection unit and perform material identification in the flow of objects based on the spectral data.

In some implementations, the sorting unit is configured to sort the objects as they fall by gravity from the conveying roller at the discharge end of the conveying path. For example, the sorting unit can be configured to divert a selected one of the objects along a selected sorting path as the selected object is free falling from the conveying surface at the discharge end of the conveying path. In some implementations, the sorting unit can include at least one air jet configured to propel pressurized air toward the selected object. In some implementations, the selected sorting path can lead to one of a plurality of sorting bins configured to receive the sorted objects. More particularly, in some implementations, the optical sorting system can further include a plurality of sorting bins configured for receiving the sorted objects. Thus, when the sorting unit can include at least one air jet for propelling pressurized air toward the objects free falling from the conveying surface of the roller at the discharge end of the conveying path, the falling objects can be selectively directed into corresponding sorting bins. Depending on the application, the air flow produced by the at least one air jet can be adjustable in pressure and/or orientation. In some implementations, the at least one air jet consists of a plurality of air jets. In this case, the plurality of air jets can include a first set of upwardly oriented air jets and a second set of downwardly oriented air jets.

In accordance with another aspect, there is provided a rotatable conveying roller such as described herein for use in a spectral identification system and/or an optical sorting system.

In accordance with another aspect, there is provided a spectral identification method for spectrally analyzing a flow of objects, the spectral identification method including:
 conveying the objects on a conveying surface along a conveying path extending between a feed end and a discharge end thereof, the conveying surface corresponding to an outer lateral periphery of a conveying roller;

projecting illumination light toward an illumination zone intersecting at least part of the conveying path to illuminate the flow of objects as the objects are conveyed on the conveying surface;

detecting object light emanating from the flow of objects in the illumination zone, and outputting spectral data representative of the detected object light; and performing material identification in the flow of objects based on the spectral data.

In some implementations, the spectral identification method further includes supplying the objects to the conveying surface at the feed end of the conveying path, and/or discharging the objects from the conveying roller by gravity at the discharge end of the conveying path. In some implementations, the conveying step includes conveying the objects at a conveying speed ranging from about 0.1 meter per second (m/s) to about 1.5 meters per second.

Depending on the application, the projecting step can include emitting the illumination light with either a single optical source or a plurality of optical sources. In some implementations, the projecting step can include emitting the illumination light in an illumination waveband including wavelengths ranging from about 0.2 micrometer to about 15 micrometers; or ranging from about 0.4 micrometer to about 0.7 micrometer; or ranging from about 0.9 micrometer to about 1.7 micrometers; or ranging from about 1.3 micrometers to about 1.9 micrometers; or ranging from about 3 micrometers to about 8 micrometers. In such implementations, the detecting step can include detecting the object light in a detection waveband ranging from about 0.2 micrometer to about 15 micrometers; or ranging from about 0.4 micrometer to about 0.7 micrometer; or ranging from about 0.9 micrometer to about 1.7 micrometers; or ranging from about 1.3 micrometers to about 1.9 micrometers; or ranging from about 3 micrometers to about 8 micrometers.

In some implementations, the detecting step can include detecting the object light as specularly reflected light produced by specular reflection of the illumination light from the objects, and/or as diffusively reflected light produced by diffuse reflection of the illumination light from the objects, and/or as transmitted light produced by transmission of the illumination light through the objects and the conveying surface.

In some implementations, the projecting step includes providing the illumination unit as a halogen lamp including a heatable filament having an operating temperature of at least about 2000 kelvins, for example between about 2000 kelvins and about 3500 kelvins, and a cladding enclosing the heatable filament and forming a hermetically sealed cavity containing a fill gas including a halogen, the illumination light including wavelengths lying in an illumination waveband ranging from about 3 micrometers to about 8 micrometers. In some implementations, the cladding can be made of quartz and the heatable filament is made of tungsten. In some implementations, the method can further include a step of reflecting the illumination light toward the object with an optical reflector, for example an elliptical reflector having a primary focus and a secondary focus. In such a case, the method can include positioning the primary focus to coincide substantially with the blackbody-like source and positioning the secondary focus to coincide with the object.

In some implementations, the performing step can include the steps of: identifying, in the spectral data, a measured spectral signature—or a set of such signatures—associated with the flow of objects; providing a library containing a plurality of reference spectral signatures associated with a respective plurality of material properties (e.g., composi-tions or colors); accessing the library and finding a match between the measured spectral signature and a corresponding one of the reference spectral signatures stored in the library; and assigning to the flow of objects the respective one of the material properties associated with the corresponding one of the reference spectral signatures.

In some implementations, the objects can include metals, alloys, semiconductors, plastics, ceramics, glasses, organic materials, or a mixture thereof. For example, the objects can be composed of polyethylene terephthalate (PET) and polyethylene terephthalate glycol-modified (PETG). In some implementations, the flow of objects is a non-homogeneous flow of particles, for example a flow of plastic particles or flakes. For example, the flow of objects can include a mixture of plastic materials or a mixture of plastic and glass materials. Depending on the application, the objects can be white, lightly colored, black and/or darkly colored, and have a characteristic size ranging from about 0.2 millimeter to about 50 millimeters, more particularly between about 2 millimeters and about 25 millimeters.

In accordance with another aspect, there is provided an optical sorting method for optically sorting a flow of objects, the optical sorting method including: performing a spectral identification method as described herein; and sorting the objects discharged from the conveying roller based on the material identification.

In some implementations, the sorting step can include sorting the objects at a sorting rate ranging from about 10 kilograms per hour (kg/h) to about 1000 kilograms per hour. In some implementations, the sorting step can include sorting the objects as they fall by gravity from the conveying roller at the discharge end of the conveying path, for example by diverting a selected one of the objects along a selected sorting path as the selected object is free falling from the conveying surface at the discharge end of the conveying path. This can be achieved by propelling pressurized air toward the selected object and/or directing the selected object into one of a plurality of sorting bins.

In accordance with another aspect, there is provided an infrared emitter-detector assembly for measuring a mid-wavelength infrared (MWIR) spectral response of an object in an illumination zone, the infrared emitter-detector assembly including:

an illumination unit including a blackbody-like source having an operating temperature of at least about 2000 kelvins, the illumination unit being configured to emit illumination light upon the object in the illumination zone, the illumination light including wavelengths lying in an illumination waveband ranging from about 2.5 micrometers to about 8 micrometers; and a MWIR detection unit having a detection waveband encompassing the illumination waveband and configured to detect object light emanating from the object in the illumination zone upon illumination by the illumination light, the detected object light conveying information associated with the MWIR spectral response of the object.

In some implementations, the illumination waveband ranges from about 3 micrometers to about 8 micrometers.

In some implementations, the illumination unit includes a cladding, for example made of quartz, surrounding at least partly the blackbody-like source, the cladding being at least partially transparent to electromagnetic radiation in at least part of the spectral range of interest.

The cladding can be in thermal contact with and heated by the blackbody-like source to emit cladding light including wavelengths lying in at least part of the illumination waveband and forming part of the illumination light. In some implementations, the cladding forms a hermetically sealed cavity around the blackbody-like source, the hermetically sealed cavity containing a fill gas including a halogen. In some implementations, the blackbody-like source is a heatable filament, for example the heatable filament of an incandescent lamp, more particularly a halogen lamp. The heatable filament can be made of tungsten. In some implementations, the operating temperature of the blackbody-like source can range between about 2000 kelvins and about 3500 kelvins.

In some implementations, the cladding is made of a material that absorbs light emitted by the blackbody-like source above 3.5 µm. In such implementations, the cladding is in thermal contact with and heated by the blackbody-like source sufficiently to start emitting cladding light that contains wavelengths ranging from 3.3 µm to 8 µm. As such, the cladding light (at least 3.3 µm-8 µm) and the unabsorbed portion of the light emitted by the blackbody-like source (3 µm-3.5 µm) transmitted through the cladding form the illumination light (with a continuous spectrum in the range 3 µm-8 µm) that reaches the object to be spectrally characterized.

In some implementations, the illumination unit includes an optical reflector positioned to receive and reflect the illumination light toward the object. For example, the optical reflector can be an elliptical reflector, which can have a primary focus coincident with, or proximate to, the blackbody-like source and a second focus substantially coincident with, or proximate to, the illumination zone. Such an elliptical reflector is configured to receive the illumination light (or a substantial portion thereof) emitted by the illumination unit and to direct the illumination light onto the object.

In some implementation, the MWIR detection unit can be a hyperspectral imager, a multispectral imager or an infrared camera. Depending on the application, the MWIR detection unit can be configured to detect the object light as specularly reflected light produced by specular reflection of the illumination light from the object, and/or as diffusively reflected light produced by diffuse reflection of the illumination light from the object, and/or as transmitted light produced by transmission of the illumination light through the object.

In some implementations, the infrared emitter-detector assembly can further include a support for supporting the object in the illumination zone. Depending on the application, the support can be configured to maintain the object at rest in the illumination zone or to convey the object along a conveying path across or toward the illumination zone. In the latter case, the support can include a conveying roller such as described above, a conveyor belt, an inclined plane, or the like.

In accordance with another aspect, there is provided a method for measuring a mid-wavelength infrared (MWIR) spectral response of an object in an illumination zone, the method including:
emitting illumination light upon the object in the illumination zone with an illumination unit including a blackbody-like source maintained at an operating temperature of at least about 2000 kelvins, the illumination light including wavelengths lying in an illumination waveband ranging from about 2.5 micrometers to about 8 micrometers; and
detecting object light emanating from the illuminated object in detection waveband encompassing the illumination waveband, the detected object light conveying information associated with the MWIR spectral response of the object.

In some implementations, the method can further include providing the illumination unit as a halogen lamp including a heatable filament defining the blackbody-like source and a cladding enclosing the heatable filament and forming a hermetically sealed cavity containing a fill gas including a halogen. For example, the cladding can be made of quartz and the heatable filament can be made of tungsten.

In some implementations, the method can further include reflecting the illumination light toward the object with an optical reflector, for example an elliptical reflector having a primary focus and a secondary focus. In such a case, the method can include positioning the primary focus to coincide substantially with the blackbody-like source and the secondary focus to coincide with the object.

In some implementations, the method can include maintaining the operating temperature of the blackbody-like source between about 2000 kelvins and about 3500 kelvins, for example higher than 2100 kelvins, or higher than 2200 kelvins, or higher than 2300 kelvins, or higher than 2400 kelvins, or higher than 2500 kelvins, or higher than 2600 kelvins, or higher than 2700 kelvins, or higher than 2800 kelvins, or higher than 2900 kelvins, or higher than 3000 kelvins, or higher than 3100 kelvins, or higher than 3200 kelvins, or higher than 3300 kelvins, or higher than 3400 kelvins, or higher than 3500 kelvins.

Depending on the application, the detecting step can include detecting the object light as specularly reflected light produced by specular reflection of the illumination light from the object, and/or as diffusively reflected light produced by diffuse reflection of the illumination light from the object, and/or as transmitted light produced by transmission of the illumination light through the object.

Depending on the application, the method can be performed while the object is at rest in the illumination zone or conveyed along a conveying path across or toward the illumination zone. In the latter case, the object can be conveying on various structures, for example a conveying roller such as described herein, a conveyor belt, an inclined plane, or the like. It should be noted that when the conveying structure is a conveying roller, the illumination unit and the MWIR detection unit of the infrared emitter-detector assembly can be used, respectively, as the illumination unit and the spectral detection unit of the spectral analysis system and/or the optical sorting system described herein.

In accordance with another aspect, there is provided an illumination unit for probing an MWIR spectral response of an object in a wavelength range extending between about 3 micrometers and about 8 micrometers. The illumination unit includes a blackbody-like source maintained at an operating temperature of at least about 2000 kelvins. The illumination unit emitting illumination light upon the object, the illumination light having an illumination spectrum extending over at least a spectral range of interest containing wavelengths ranging from about 3 micrometers to about 8 micrometers.

In accordance with another aspect, there is provided a spectral identification system for spectrally analyzing a flow of objects, the spectral identification system including:
a conveying roller having a longitudinal rotation axis and an outer lateral periphery, the outer lateral periphery defining a conveying surface to support and transport the objects along a conveying path extending from a feed end to a discharge end thereof;
an illumination unit including a blackbody-like source having an operating temperature of at least about 2000 kelvins, the illumination unit projecting illumination light toward an illumination zone that intersects at least part of the conveying path to illuminate the flow of objects on the conveying surface, the illumination light including wavelengths lying in an illumination waveband ranging from about 3 to about 8 micrometers; and a MWIR detection unit having a detection waveband encompassing the illumination waveband and configured to detect object light emanating from the flow of objects in the illumination zone and output infrared spectral data representative of the detected object light; and a processing unit configured to receive the infrared spectral data from the MWIR detection unit and derive therefrom material identification information associated with the objects.

In accordance with another aspect, there is provided an optical sorting system for optically sorting a flow of objects, the optical sorting system including a spectral identification system including a conveyor, an illumination unit, a MWIR detection unit and a processing unit such as just described, and a sorting unit coupled to the processing unit and configured to sort the objects at the discharge end from the material identification information derived by the processing unit.

Other features and advantages of the present description will become more apparent upon reading of the following non-restrictive description of specific embodiments thereof, given by way of example only with reference to the appended drawings.

BRIEF DESCRIPTION OF THE DRAWINGS

In FIGS. 4A and 4B, the system is configured to measure the object light as transmitted light having passed through the conveying surface of the conveying roller.

DETAILED DESCRIPTION

Figure 1:
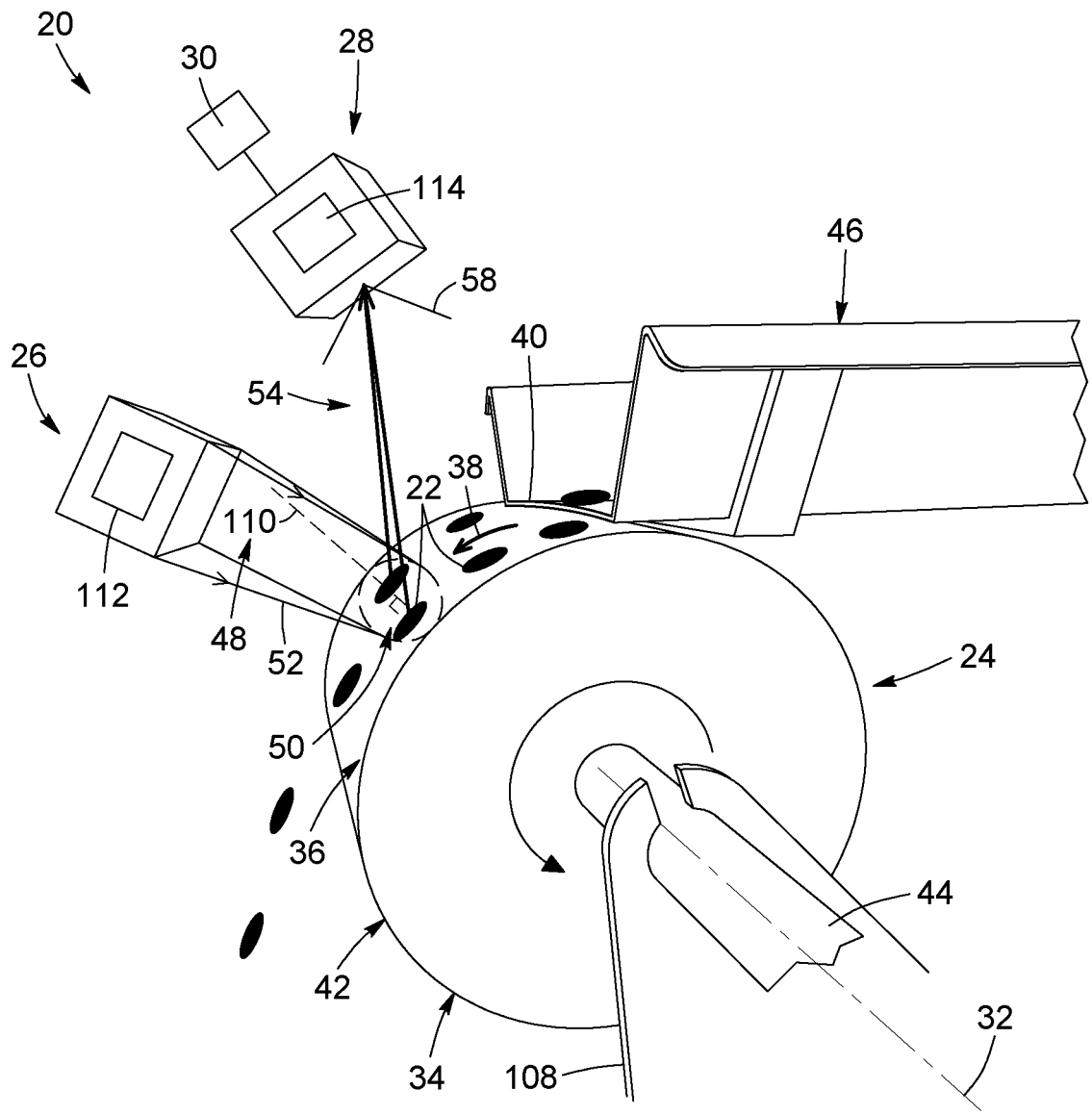
FIG. 1 is a perspective view of a spectral identification system, according to an embodiment.

In the following description, similar features in the drawings have been given similar reference numerals, and, to not unduly encumber the figures, some elements may not be indicated on some figures if they were already identified in one or more preceding figures. It should also be understood herein that the elements of the drawings are not necessarily depicted to scale, since emphasis is placed upon clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. More particularly, it will be understood that such spatially relative terms are intended to encompass different orientations in the use or operation of the present embodiments, in addition to the orientations exemplified in the figures.

In the following description, and unless stated otherwise, the terms "connected", "coupled", and variants and derivatives thereof, refer to any connection or coupling, either direct or indirect, between two or more elements. The connection or coupling between the elements may be mechanical, physical, optical, operational, electrical, thermal, or a combination thereof.

The terms "a", "an" and "one" are defined herein to mean "at least one", that is, these terms do not exclude a plural number of elements, unless stated otherwise. It should also be noted that terms such as "substantially" and "about" that modify a value, condition or characteristic of a feature of an exemplary embodiment, should be understood to mean that the value, condition or characteristic is defined within tolerances that are acceptable for proper operation of this exemplary embodiment for its intended application.

General Overview—Spectral Identification and Optical Sorting of Materials

The present description generally relates to techniques for material identification and discrimination using imaging spectroscopy, for example infrared spectroscopy. More particularly, the present techniques can involve measuring and analyzing a spectral response of an object, or a flow of objects, and performing a material-specific identification of the object, or the flow of objects, for example based on composition or color, from the spectral measurement and analysis.

The present techniques may be useful in a various spectral material identification and optical sorting applications and scenarios. For example, some implementations of the present techniques can be used in material characterization applications that aim to determine the nature or composition of an object under test by measuring and analyzing a spectral feature, characteristic or signature of the object. Other implementations of the present techniques can be used in optical sorting applications that aim to separate, group, classify or divide objects based on a spectral identification or discrimination of the objects. In the present description, implementations that involve spectral identification without subsequent optical sorting can be referred to as "spectral identification systems" or "spectral identification methods". Meanwhile, implementations of the present techniques that involve both spectral identification and optical sorting will be referred to as "optical sorting systems" or "optical sorting methods".

Broadly stated, and as described in further detail below, the present description relates to a system for treating a flow of objects. The system can include a conveying roller having a longitudinal rotation axis and an outer lateral periphery, the outer lateral periphery defining a conveying surface to support and transport the objects along a conveying path extending from a feed end to a discharge end thereof; an illumination unit configured to project illumination light toward an illumination zone intersecting at least part of the conveying path to illuminate the flow of objects on the conveying surface; a spectral detection unit configured to detect object light emanating from the flow of objects in the illumination zone upon illumination by the illumination light and output spectral data representative of the detected object light; and a processing unit configured to receive the spectral data output by the spectral detection unit and derive material-specific information associated with the objects from the received spectral data. In optical sorting implementations, the system can include a sorting unit coupled to the processing unit and configured to sort the objects exiting the conveying path based on the material-specific information. The sorting unit can be omitted in spectral identification implementations.

In the present description, the term "object" is meant to encompass broadly any structure, feature or information of interest which is to be spectrally identified using the present techniques. In some implementations, the object or objects can be particles. The term "particle" and any variant thereof refer herein to any individual mass, structure, or any collection thereof, that can be spectrally characterized by the techniques described herein. In principle, the term "particle" is not meant to be restricted with respect to size, shape, color, or composition. For example, some implementations may be suited for identifying or sorting particles having a characteristic size ranging from about 0.2 mm to 50 mm, more particularly, from about 2 mm to 25 mm, although other sizes may be envisioned in other embodiments. In some implementations, the particles can be suspended, dispersed or otherwise contained in a host medium.

The objects can be organic, inorganic or some combinations thereof. The objects may be composed of various kinds of materials including, without limitation, metals, alloys, semiconductors, plastics, ceramics, glasses, fibers, organic and natural materials, waste materials, and the like. In this regard, the present techniques may be well adapted for identifying and sorting plastic materials, for example for waste treatment and recycling applications. In this context, terms like "plastic particles", "plastic flakes", "plastic residues", and the like, can be used to refer to the objects. The objects can have various shapes including, but not limited to, spheres, spheroids, ellipsoids, rods, disks, cubes, polyhedrons, flakes, platelets, irregular or complex shapes of various proportions, and combinations thereof. Furthermore, the objects can have a variety of colors including white, black, light colors, and dark colors. Depending on the application, the objects can be transparent, partially transparent, or opaque in the spectral range of interest.

The objects can be spectrally characterized either at rest or in movement. In the latter case, the objects can be said to form a flow or stream of objects conveyed along a conveying path, as described in greater detail below. More particularly, in some implementations, the objects are spectrally characterized while they are supported and conveyed on the outer lateral or peripheral surface of a rotatable conveying roller (e.g., a cylindrical conveying roller). More detail regarding the structure and operation of such a rotatable conveying roller will be provided below.

In the present description, the terms "light" and "optical", and any variants and derivatives thereof, are intended to refer to electromagnetic radiation in any appropriate region of the electromagnetic spectrum, and they are not limited to visible light. By way of example, in some embodiments, the terms "light" and "optical" may encompass electromagnetic radiation with a wavelength ranging from about 0.2 to 15 µm. More particularly, although some implementations of the present techniques can be useful in infrared applications, other embodiments could additionally or alternatively operate in other regions of the electromagnetic spectrum, for example in the millimeter, terahertz, visible and ultraviolet regions.

Infrared radiation is commonly divided into various regions including the near-infrared (NIR) region for wavelengths ranging from 0.7 and 1.4 µm; the short-wavelength infrared (SWIR) region for wavelengths ranging from 1.4 to 2.5 or 3 µm; the mid-wavelength infrared (MWIR) region for wavelengths ranging from 2.5 or 3 to 8 µm; and the long-wavelength infrared (LWIR) region for wavelengths ranging from 8 to 15 µm. In this regard, the skilled person will appreciate that the definitions of different infrared regions in terms of spectral ranges, as well as the dividing lines between them, can vary depending on the technical field under consideration, and are not meant to limit the scope of applications of the present techniques.

Various implementations of the present techniques are described below with reference to the figures.

Spectral Identification Implementations

Referring to FIG. 1, there is illustrated an exemplary embodiment of a spectral identification system 20 for spectrally analyzing a flow or stream of objects 22. Broadly, the spectral identification system 20 can include a rotatable conveying roller 24, an illumination unit 26, a spectral detection unit 28, and a processing unit 30. The structure, configuration and operation of these and other possible components of the spectral identification system 20 will be described in greater detail below.

The conveying roller 24 has a longitudinal rotation axis 32 and an outer lateral periphery 34 that defines a conveying surface 36. The conveying surface 36 rotatably supports and transports the objects 22 along a conveying path 38. The conveying path 38 extends from a feed end 40 to a discharge end 42. In the illustrated embodiment, the conveying roller 24 is rigidly mounted on a roller shaft 44. For example, the conveying roller 24 can have a hollow central portion for receiving the roller shaft 44. Alternatively, the conveying roller 24 and the roller shaft 44 can be of a single-piece integral construction. The roller shaft 44 is rotatably mounted to a support frame 108 and connected to an actuator (not shown), for example a motor or another source of energy. The actuator is configured to provide a torque to drive and rotate the roller shaft 44, and therewith the conveying roller 24, about the longitudinal rotation axis 32. The structure, construction, dimensions and composition of the support frame 108 can be varied depending on the application. For example, the support frame 108 may include a plurality of posts, supports, or other structural or supporting elements allowing additional components to be removably or permanently mounted onto the support frame, for example the illumination unit 26 and/or the spectral detection unit 28. The support frame 108 may be embodied, by a plurality of components assembled together and defining a structure that allows the insertion of a plurality of elements, or a structure onto which the plurality of elements may be mounted. In some implementations, an air ionizer device for neutralizing static electricity on the conveying surface 36 is provided, thus preventing small objects from getting stuck to or on the conveying roller 24.

In the illustrated embodiment, the conveying roller 24 is a cylindrical roller whose outer circumferential surface defines the conveying surface 36. However, in other embodiments, the cross-section of the conveying roller 24 need not be circular, but can assume other shapes such as ovals, ellipses, polygons and grooved cylinders. In FIG. 1, the longitudinal rotation axis 32 of the conveying roller 24 lies in a horizontal plane, although this may not be the case in other embodiments. In the present description, the term "horizontal" refers to a plane or a direction substantially perpendicular to the force of gravity. Meanwhile, the term "vertical" refers to a direction substantially parallel to the force of gravity.

In the illustrated embodiment, the feed end 40 is located at or near the twelve o'clock position with respect to the rotation axis 32 of conveying roller 24, while the discharge end 42 is located at or near the nine o'clock position (or three o'clock position if viewed from the opposite side of the roller 24). In such a case, the conveying path 38 spans an arc of about 90° along the outer lateral periphery 34 of the conveying roller 24. Of course, other configurations for the positions of, and angular separation between, the feed end 40 and the discharge end 42 are possible in other embodiments.

Depending on the application, the conveying roller 24 can have various dimensions. For example, in some implementations, the conveying roller 24 can have a longitudinal extent (e.g., a length) ranging between about 100 mm and 1500 mm, and a transverse or lateral extent (e.g., a diameter) ranging between about 100 mm and 350 mm, although other dimensions can be used in other implementations. For example, in some implementations, the diameter of the conveying roller 24 can be adjusted in view of a desired length for the conveying path 38.

Referring still to FIG. 1, the conveying surface 36 can be substantially continuous and smooth. The term "smooth" is used herein to refer to a low-roughness surface. Providing the conveying surface 36 with a low surface roughness can be useful or required in some embodiments, for example to limit or otherwise control the amount of diffusely reflected light produced from the conveying surface 36 of the conveying roller 24 upon illumination of the flow of objects 22 by the illumination unit 26. In the illustrated embodiment, the surface normal 108 to the conveying surface 36 at any point on the conveying surface 36 is substantially perpendicular to the longitudinal rotation axis 32, although other relative orientations are possible in other embodiments.

Depending on the application, the conveying roller 24 can be made of different materials and have different colors. Examples of suitable materials for the conveying roller 24 can include, without limitation, polytetrafluoroethylene (PTFE), polyether ether ketone (PEEK), white or colored ultra-high-molecular-weight polyethylene (UHMW-PE), aluminum or steel. The conveying roller 24 may be made from a thermostable material. The conveying roller 24 may have a hollow or a full body, depending on the configuration of the system 20. Example of suitable colors for the conveying roller 24 can include, without limitation, black, white, grey and brown. In some implementations, the composition and/or the color of the conveying roller 24 can be selected to provide the conveying surface 36 with specific spectral characteristics, for example in terms of absorption, transmission and/or reflection properties. More particularly, such specific spectral characteristics can be selected in view of the optical properties of the objects to be spectrally characterized on the conveying surface 36. For example, depending on the application, the absorption, transmission and/or reflection coefficients of the conveying surface 36 can be reduced, enhanced or otherwise controlled by proper selection of the composition and/or color of the conveying roller 24.

Referring still to FIG. 1, the spectral identification system 20 can also include an input feeder 46 located at or proximate the feed end 40 of the conveying path 38. The input feeder 46 is configured to supply, inject, dispose, transfer or arrange the objects 22 to be characterized onto the moving conveying surface 36 of the rotating conveying roller 24. In FIG. 1, the input feeder 46 is a vibrating table, whose vibrating motion can be adjusted to control the flow rate of the objects supplied to the roller 24. In other embodiments, the input feeder 46 can be embodied by other suitable structures, for example a belt conveyor. In FIG. 1, the position of the input feeder 46 relative to the conveying surface 36 can be adjusted vertically or horizontally according to the requirements or particularities of the intended application. Optionally, the input feeder 46 can be coupled to a storage unit (not shown) for storing the objects 22 and supplying the objects 22 to the input feeder 46.

The configuration of the conveying roller 24 can be advantageous when identifying materials in the flow of objects 22, as the conveying roller 24 allows the objects 22 to be stabilized during the optical measurements, which can facilitate more precise and more accurate measurements (e.g., spectral material identification). More particularly, the rotational speed (e.g., in number of turns per unit time) of the conveying roller 24 around the longitudinal rotation axis 32 can be adjusted to control the surface speed (e.g., in length per unit time) of the conveying surface 36, and thus of the flow rate of the objects 22 along the conveying path 38.

In some scenarios, for example, when spectrally analyzing plate-like objects, plastic flakes or, more generally objects with shape anisotropy, the orientation of the objects may have an impact on the quality of the measurements. As such, it may be advantageous, in some implementations, that the objects be analyzed in a certain orientation. In such scenarios, the conveying roller 24 described herein may be useful, as it can allow plate-like objects or flakes to lay substantially flat on the conveying surface 36, and therefore be oriented in a way that enhances the quality of the measurements. More particularly, when using a spectral detection unit 28 having a limited or relatively low acquisition frequency (e.g., a hyperspectral camera), the speed of the particles on the conveying surface 36 may need to be reduced. The dual need for a low object speed and a controlled orientation during measurements can make the use of a conveying roller such as disclosed herein particularly advantageous for spectral identification and optical sorting applications.

In some embodiments, the speed of the objects 22 on the conveying surface 36 can be about 0.1 m/s to 1.5 m/s. For example, the speed of the objects 22 can be about 1 m/s. This relatively low—yet adjustable—speed is such that a hyperspectral camera, or any other types of spectral detectors having relatively long acquisition times can advantageously be used for performing spectral material identification on the objects 22. Of course, higher or different object speeds can be used in other embodiments.

Discharging of the objects 22 from the spectral identification system 20 can also be simplified by the configuration of the conveying roller 24. For example, there may be no need for a scrapper, or the like, to discharge the objects 22. Rather, the objects 22 can be automatically discharged (i.e., under the action of gravity) from the spectral identification system 20 after spectral identification. More specifically, the objects 22 leave or disengage from the conveying surface 36 by gravity once they reach the discharge end 42 of the conveying path 38, and then fall under the force of gravity. For example, the falling speed of the objects 22 may be about 1.5 m/s or less during their fall, after ejection or disengagement from the rotating conveying roller 24.

It will be understood that a conveying roller 24 such as disclosed herein, whose rotation axis 32 is substantially horizontal and whose conveying surface 36 has a surface normal 110 everywhere perpendicular to the rotation axis 32, can be less sensitive to the often-detrimental effects of the centrifugal force, notably compared to known spectral identification systems that use rotating discs. In such rotating-disc designs, the rotation axis is vertical and parallel to the surface normal of the conveying surface that supports the objects to be spectrally identified, which conveying surface corresponds to the top end, horizontal surface of the rotating disc. The conveying roller 24 shown in FIG. 1 can further allow the speed of the objects 22 to be controlled not only as they are conveyed on the conveying surface 36, but also during their fall (e.g., to more accurately eject the objects 22). Indeed, the speed of the objects 22 as they leave the conveying roller 24 substantially corresponds to their speed on the conveying surface 36.

Referring still to FIG. 1, the illumination unit 26 is configured to emit illumination light 48 toward an illumination zone 50 that intersects at least part of the conveying path 38 to illuminate the flow of objects 22 on the conveying surface 36. In the present description, the term "illumination unit", or "illumination source assembly", broadly refers to any optical source or combination of optical sources capable of generating illumination light that can be used to elicit an optical response from the objects that can be used in spectral identification applications.

The illumination unit 26 can be based on different lighting technologies such as, for example, solid-state lighting including lasers, light-emitting diodes (LEDs) and organic LEDs (OLEDs), incandescent lighting, halogen lighting, fluorescent lighting, infrared heat emitters, discharge lighting, and any combination thereof. Depending on the application, the illumination unit 26 can be operated in either a continuous and an intermittent (e.g., pulsed) regime. The choice of lighting technology can be dictated by several factors including, without limitation, the wavelength, irradiance, and spatial and spectral illumination profiles of the illumination light 48. The illumination unit 26 can include either a single optical source or a plurality of optical sources. In the latter case, each optical source produces a respective portion of the illumination light 48. It should be noted that in implementations including more than one optical source, the different optical sources need not all be based on the same lighting technology and/or have identical illumination parameters.

The illumination unit 26 can include illumination optics 112 configured to shape or condition the illumination light or light beam 48 and provide a field of illumination 52 having the desired characteristics for irradiating the illumination zone 50 in an effective manner. For example, the illumination optics 112 can include lenses, mirrors, filters, and other suitable reflective, refractive and/or diffractive optical components.

In some implementations, the illumination light 48 emitted by the illumination unit 26 can have a spectrum encompassing an illuminating waveband that lies in the infrared range of the electromagnetic spectrum. For example, the illumination unit 26 can be configured to emit the illumination light 48 in an illumination waveband including wavelengths ranging from about 0.2 µm to about 15 µm, or from about 0.4 µm to about 0.7 µm, or from about 0.9 µm to about 1.7 µm, or from about 1.3 µm and 1.9 µm, or from about 3 µm and 8 µm. However, the present techniques are not limited to infrared applications, but can be used in other regions of the electromagnetic spectrum, for example in the millimeter, terahertz, visible and ultraviolet regions.

Referring still to FIG. 1, the illumination unit 26 can be located at a given position with respect to the conveying surface 36. This position can be adjustable to control the irradiance of the beam of illumination light 48 on the illumination zone 50. Controlling the irradiance of the beam of illumination light 48 may be useful, for example, to preserve the physical integrity of the objects 22, avoid altering the nature (e.g., phase) of the objects 22 during the measurements, and/or induce or control an amplitude of a certain optical response from the objects 22. For example, the distance between the illumination unit 26 and the objects 22 on the conveying surface 36 in the illumination zone 50 may range from about 50 mm to about 1000 mm.

The spectral detection unit 28 is configured to detect, within its field of view 58, object light 54 emanating from the flow of objects 22 in the illumination zone 50 and output spectral data representative of the detected object light 54. The term "spectral detection unit", or "spectrally resolved detection unit", broadly refers to any optical detector or receiver, or any combination of optical detectors or receivers, capable of measuring a spectrally dependent response (e.g., as a function of frequency or wavelength over a certain spectral range) of an input optical signal. The or each optical detector in the spectral detection unit 28 generally operates as an opto-electrical receiver configured for receiving the input optical signal and for outputting an electrical signal representing the received input optical signal. The electrical signal can be sampled and digitized as spectral data representative of the detected input signal. It should be noted that in some implementations, the present techniques do not preclude the use of intensity-based detectors (e.g., CCD or CMOS sensors and imagers) without spectral scanning, for example to detect the presence or absence of a material having a response within the spectral bandwidth of the detector.

The spectral detection unit 28 can include different types of spectrally sensitive detectors and cameras, including spectrophotometers, optical spectrum analyzers, swept-wavelength systems, hyperspectral imagers, multispectral imagers, color and monochrome cameras, or any appropriate type of spectral measurement device. Both one-dimensional or two-dimensional spectral detectors can be used, depending on the application. More particularly, infrared-sensitive hyperspectral cameras can be well suited to identify small (e.g., 2-25 mm), "hard-to-detect", and/or other complex or "non-standard" objects. In some non-limiting embodiments, the spectral detection unit includes a detector configured to detect the object light in a detection waveband ranging from about 0.2 µm to about 15 µm, or from about 0.4 µm to about 0.7 µm, or from about 0.9 µm to about 1.7 µm, or from about 1.3 µm to about 1.9 µm, or from about 3 µm to about 8 µm.

However, as mentioned above, the spectral detection unit 28 can be operated in various regions of the electromagnetic spectrum (e.g., from the millimeter to the UV range), and not only in the infrared range.

In the present description, the expression "light emanating from" is intended to refer as any light having interacted with the objects 22 prior to being detected by the spectral detection unit 28. For example, this expression encompasses, but is not limited to, reflected, transmitted, and scattered light. The object light 54 emanating from the flow of objects 22 in the illumination zone can also originate from absorption-reemission, fluorescence emission and/or nonlinear optical processes. More particularly, in some implementations, the object light 54 represents the portion of the illumination light 48 that was not absorbed by the objects 22 and that was reflected from or transmitted through the conveying surface 36. In such implementations, the object light 54 can therefore provide information about the absorption spectrum or properties of the objects 22. In other implementations, the object light 54 can additionally or alternatively provide information about the reflectance spectrum of the objects 22. It is noted that when the conveying surface 36 is configured to reflect the portion of the illumination light 48 that was not absorbed by the objects 22, this reflected light passes through the objects 22 a second time before reaching the spectral detection unit 28. Such a "two-pass" configuration can be useful, for example, when identifying objects 22 having a low absorption coefficient, such as transparent or semi-transparent materials.

In FIG. 1, the spectral detection unit 28 is mounted onto the support frame 108, but could alternatively be provided on a tripod, or the like, placed near the conveying roller 24.

Depending on the application, the spectral detection unit 28 can include collecting optics 114 adapted to collect the object light 54 emanating from the illumination zone 50. The collecting optics 114 can include lenses, mirrors, filters, optical fibers and any other suitable reflective, refractive and/or diffractive optical components.

In some implementations, the illumination unit 26 and the spectral detection unit 28 could be provided as, or integrated into, a single-unit device or system having both illumination and spectral detection capabilities.

In the embodiment of FIG. 1, the optical measurements from which spectral identification is carried out are performed with the objects 22 supported and transported on the outer lateral periphery 34 of the rotating conveying roller 24, that is, when the objects 22 are conveyed on, and in contact with, the conveying surface 36. That is, the conveying surface 36 crosses the illumination zone 50 as it rotates about the longitudinal rotation axis 32. This feature of the present techniques differs from existing devices that perform optical measurements on a stream of falling objects. It should further be noted that in the embodiment of FIG. 1, there is no relative motion between the objects 22 and their background (i.e., the conveying surface 36 of the roller 24) in the illumination zone 50. In contrast, in existing devices involving a stream of falling objects, the objects are in motion relative to their background during the optical measurements. In some embodiments, the conveying surface 36 of the roller 24 can be configured (i.e., by selecting its color and/or spectral properties) to provide a white or otherwise neutral and well-controlled background surface against which to detect the object light 54 emanating from the objects 22.

The object light 54 collected and detected by the spectral detection unit 28 can be processed (e.g., converted to electrical data and digitized) using standard techniques and outputted as spectral data representative of the detected object light 54.

The processing unit 30 is operatively connected to the spectral detection unit 28. More particularly, the processing unit 30 is configured to receive the spectral data from the spectral detection unit 28 and to perform material identification in the flow of objects 22 based on the spectral data by deriving material-specific information associated with the flow objects. Since the general principles underlying the identification of material characteristics (e.g., composition, color, size and shape) from measured spectral data is generally well known to one skilled in the art, they need not be covered in detail herein.

In the present description, the term "processing unit", or "processor", refers to an entity that controls and executes, at least in part, functions for operating the spectral identification system including, without being limited to, performing material identification in the flow of objects from the measured spectral data. The processing unit 30 can be provided within one or more general purpose computers and/or within any other dedicated computing devices. The processing unit can be implemented as a single unit or as a plurality of interconnected processing sub-units. The term "processor" should not be construed as being limited to a single processor, and accordingly any known processor architecture may be used. Depending on the application, the processing unit 30 can be embodied by a computer, a microprocessor, a microcontroller, a central processing unit, or by any other type of processing resources or any combination of such processing resources configured to operate collectively as a processing unit. The processing unit 30 can be implemented in hardware, software, firmware, or any combination thereof, and be connected to the various components of the spectral identification system 20 via appropriate communication ports.

In some implementations, the material identification performed by the processing unit 30 can involve identifying, in the spectral data, one or more measured spectral signatures associated with the flow of objects 22. The material identification can also involve providing a library (e.g., a virtual library or a spectrum database) containing a plurality of reference spectral signatures associated with a respective plurality of material properties (e.g., compositions). The library can be accessed to assign or find a match between each one of the measured spectral signatures and a corresponding one of the reference spectral signatures. In the present description, the terms "match", "matching" and "matched" are meant to encompass not only "exactly" or "identically" matching the measured and reference spectral signatures, but also "substantially", "approximately" or "subjectively" matching the measured and reference spectral signatures, as well as providing a higher or best match among a plurality of matching possibilities. The terms "match", "matching" and "matched" are therefore intended to refer herein to a condition in which two elements are either the same or within some predetermined tolerance of each other.

In some scenarios, the flow of objects 22 can be a non-homogeneous flow, which could include, for example, a flow of plastic particles or flakes. The objects 22 to be spectrally analyzed can vary according to one or several properties, such as their size, shape, color, composition, or any other distinctive features of the objects 22. Alternatively, the flow of objects 22 could be a homogeneous flow of substantially similar particles which could include, contrary to the non-homogeneous flow, a flow of plastic particles or flakes having substantially the same or similar properties.

Depending on the application, the processing unit 30 may be fully or partially integrated with, or physically separate from, other hardware components of the spectral identification system 20, including, but not limited to, the illumination unit 26 and the spectral detection unit 28. For example, in some embodiments, the spectral detection unit 28 and the processing unit 30 can be combined in a single-unit device, and therefore be electrically and/or mechanically connected through appropriate components and/or mechanisms. By way of an example, the spectral detection unit 28 and the processing unit 30 can be integrated in a spectral imager, such as an infrared-sensitive spectral camera, or in a color or monochrome camera. Alternatively, the spectral detection unit 28 and the processing unit 30 could be provided into two independent but interconnected devices. In such configuration, the spectral detection unit 28 and the processing unit 30 are still operatively connected through appropriate link(s) without direct physical connection.

Figure 2:
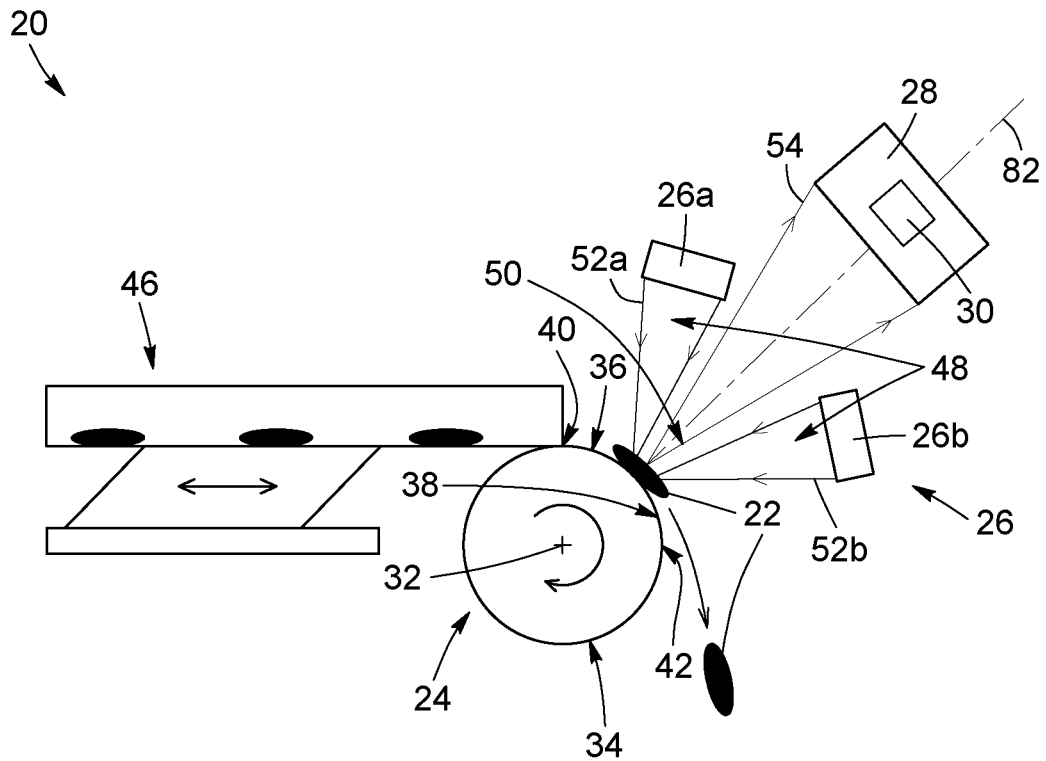
FIG. 2 is a schematic side view of a spectral identification system, according to another embodiment, where the system is configured to measure the object light as specularly reflected light.
Figure 3:
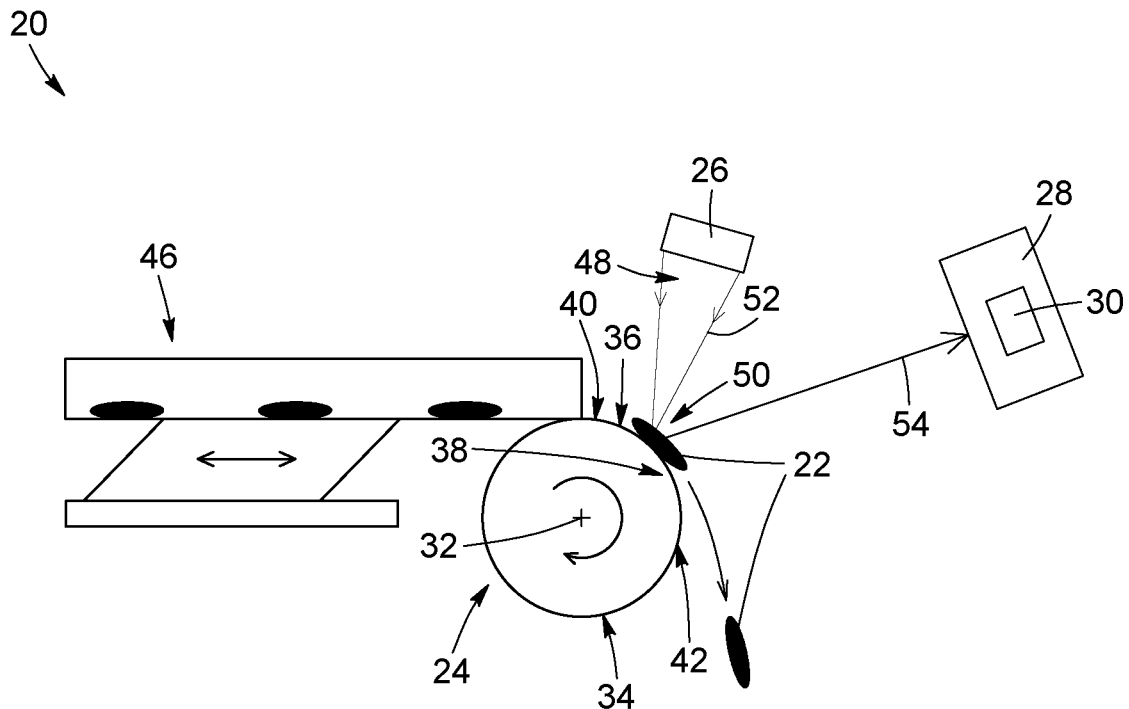
FIG. 3 is a schematic side view of a spectral identification system, according to another embodiment, where the system is configured to measure the object light as diffusively reflected light.
Figure 4A:
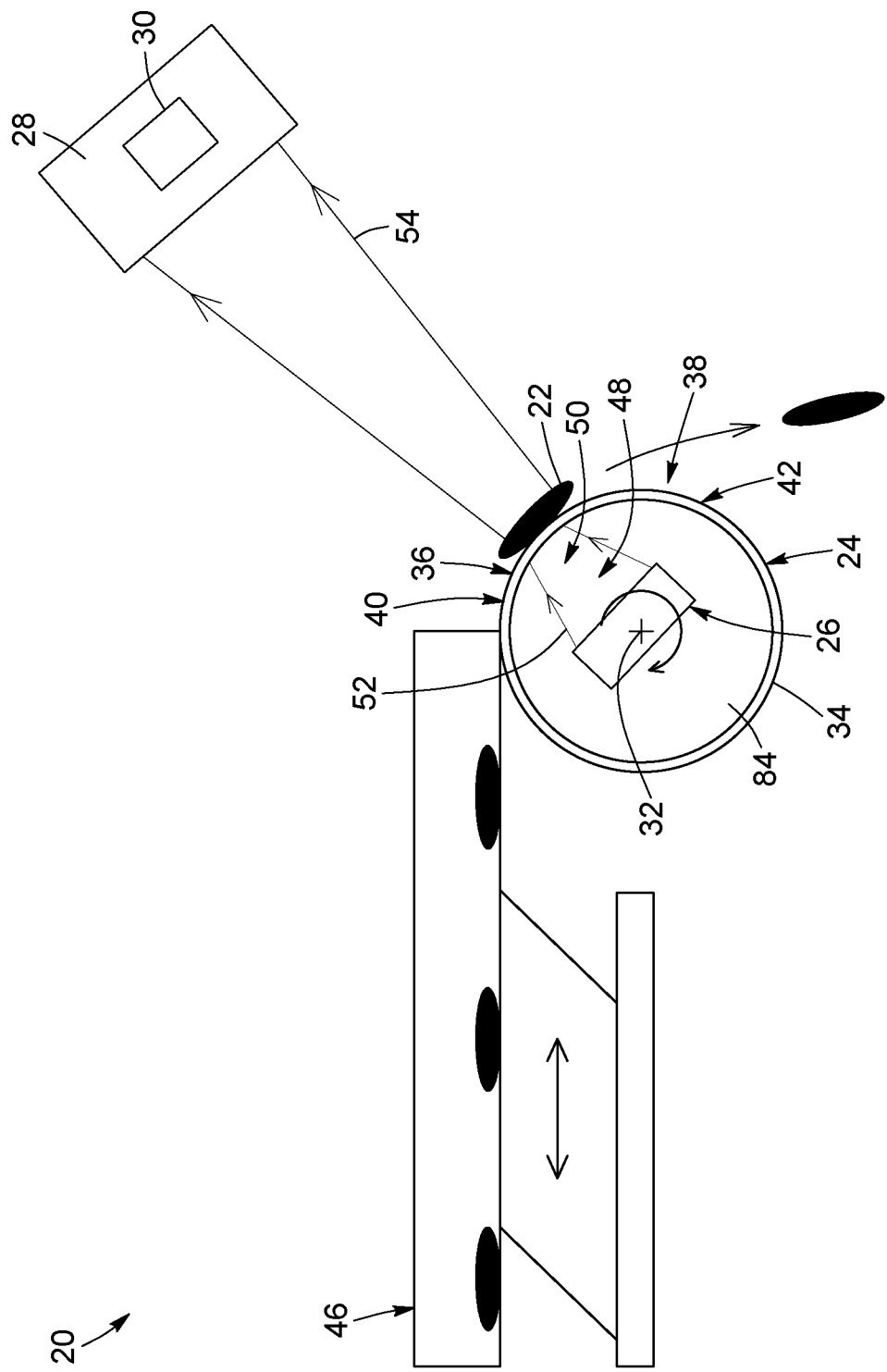
FIGS. 4A to 4C are schematic side views of a spectral identification system, according to three other embodiments, where the system includes a conveying roller having a hollow interior defining a cavity sized and shaped to accommodate therein the illumination unit (FIG. 4A), the spectral detection unit (FIG. 4B) or both the illumination unit and the spectral detection unit (FIG. 4C).
Figure 4B:
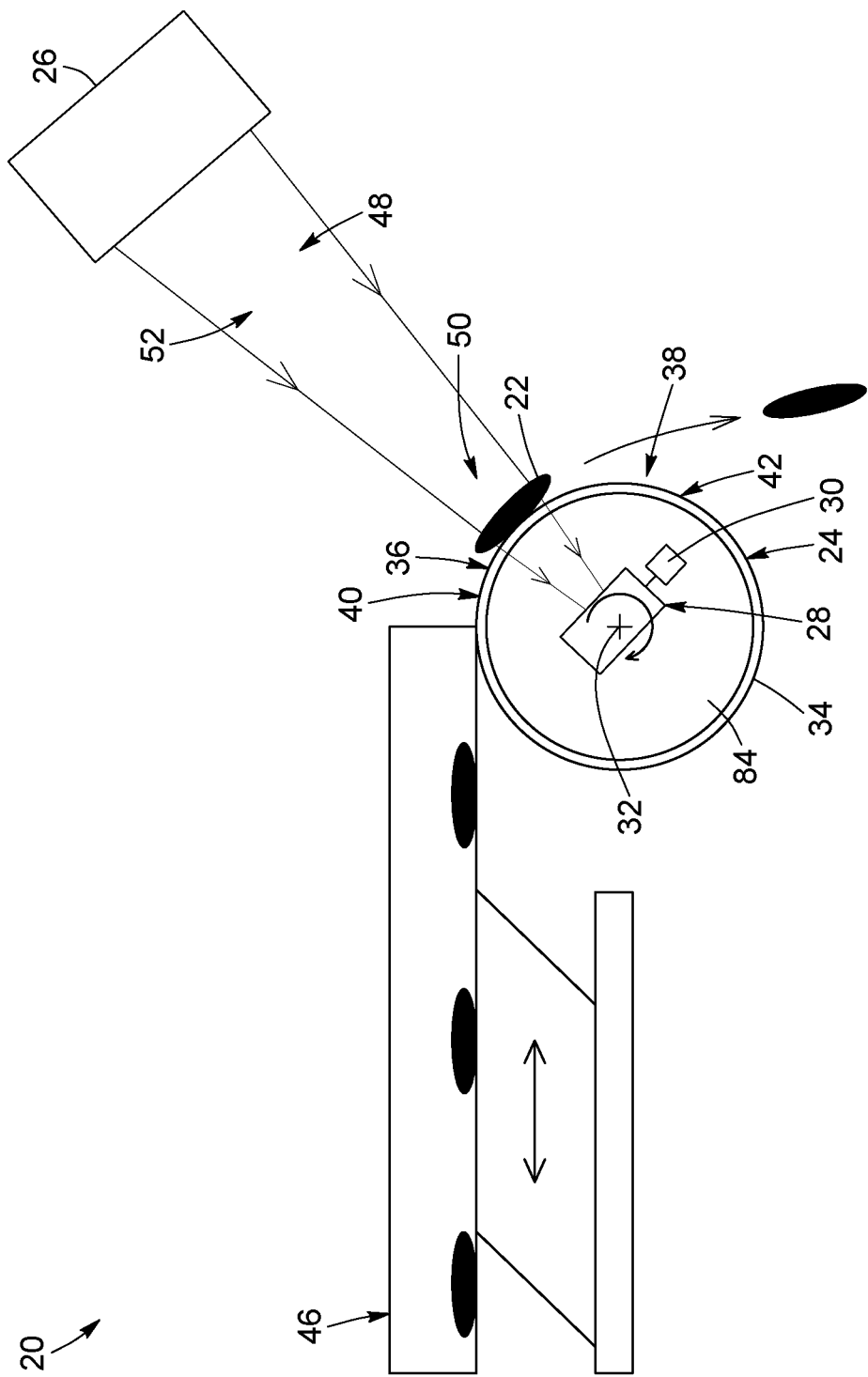

Referring now to FIGS. 2 to 4, there are illustrated different embodiments of a spectral identification system 20 for spectrally analyzing a flow of objects 22 using various kinds of object light 54. More particularly, three kinds of object light 54 are considered: diffuse (FIG. 2), specular (FIG. 3) and transmitted (FIGS. 4A and 4B).

In FIG. 2, the spectral identification system 20 is used in a diffuse reflection configuration. In such a configuration, the illumination light 48 is reflected by the objects 22 provided on the conveying surface 36 over a range of directions. The object light 54 can hence be referred to as "diffuse" or "diffusively reflected" object light 54 produced by diffuse reflection of the illumination light 48 from the objects 22. In the illustrated variant, the illumination unit 26 includes two spaced-apart optical sources 26a, 26b, each having its own field of illumination 52a, 52b. As shown, the two optical sources 26a, 26b are symmetrically disposed relative to an axis 82 projecting perpendicularly from the conveying surface 36 to the spectral detection unit 28. The spectral detection unit 28 collects a portion of the diffusively reflected object light 54. The use of two distinct optical sources 26a, 26b may be useful, for example, for optimizing or improving the intensity and/or the quality of the object light 54 received by the spectral detection unit 28. Of course, other symmetrical or nonsymmetrical optical source arrangements can be used in other embodiments.

Referring to FIG. 3, the spectral identification system 20 can be used in a "specular reflection configuration". In such a configuration, the incidence angle formed by the illumination light 48 and the surface normal 110 to the conveying surface 36 is equal or nearly equal to the reflection angle formed by the object light 54 and the surface normal 110 to the conveying surface 36. The object light 54 is hence said to be a "specular" or "specularly reflected" object light 54 produced by specular reflection of the illumination light 48 from the objects 22. In this situation, the spectral detection unit 28 is positioned to capture the specular object light 54.

Turning to FIG. 4A, the spectral identification system 20 can also be used in a "transmission configuration". In such a configuration, the conveying roller 24 has a hollow interior defining a cavity 84. The cavity 84 is sized and shaped to accommodate therein the illumination unit 26. The conveying roller 24 is made from a material that is transparent to the illumination light 48, or at least minimally interacting with the illumination light 48, to limit absorption of the illumination light by the conveying roller 24. The term "transparent" herein refers to a property of a material of allowing transmission therethrough at least a portion, and in some cases the entirety, of a certain waveband. It will be understood that the transmission properties of the material forming the conveying roller 24 may depend on the particularities of a given application. In this configuration, the illumination light 48 propagates generally outwardly radially inside the conveying roller 24, passes through the conveying surface 36, and interacts with the conveyed objects 22 in the illumination zone 50 to produce "transmitted" object light 54 (i.e., unabsorbed illumination light 48). At least a portion of the transmitted object light 54 is collected and detected by the spectral detection unit 28. It is noted that the transmitted object light 54 may reach either directly or indirectly the spectral detection unit 28 (i.e., with or without intermediate optical components, respectively). Alternatively, referring to FIG. 4B, the locations of the illumination unit 26 and the spectral detection unit 28 could be switched, that is, the illumination unit 26 and the spectral detection unit 28 could be provided respectively outside and inside the conveying roller 24.

Figure 4C:
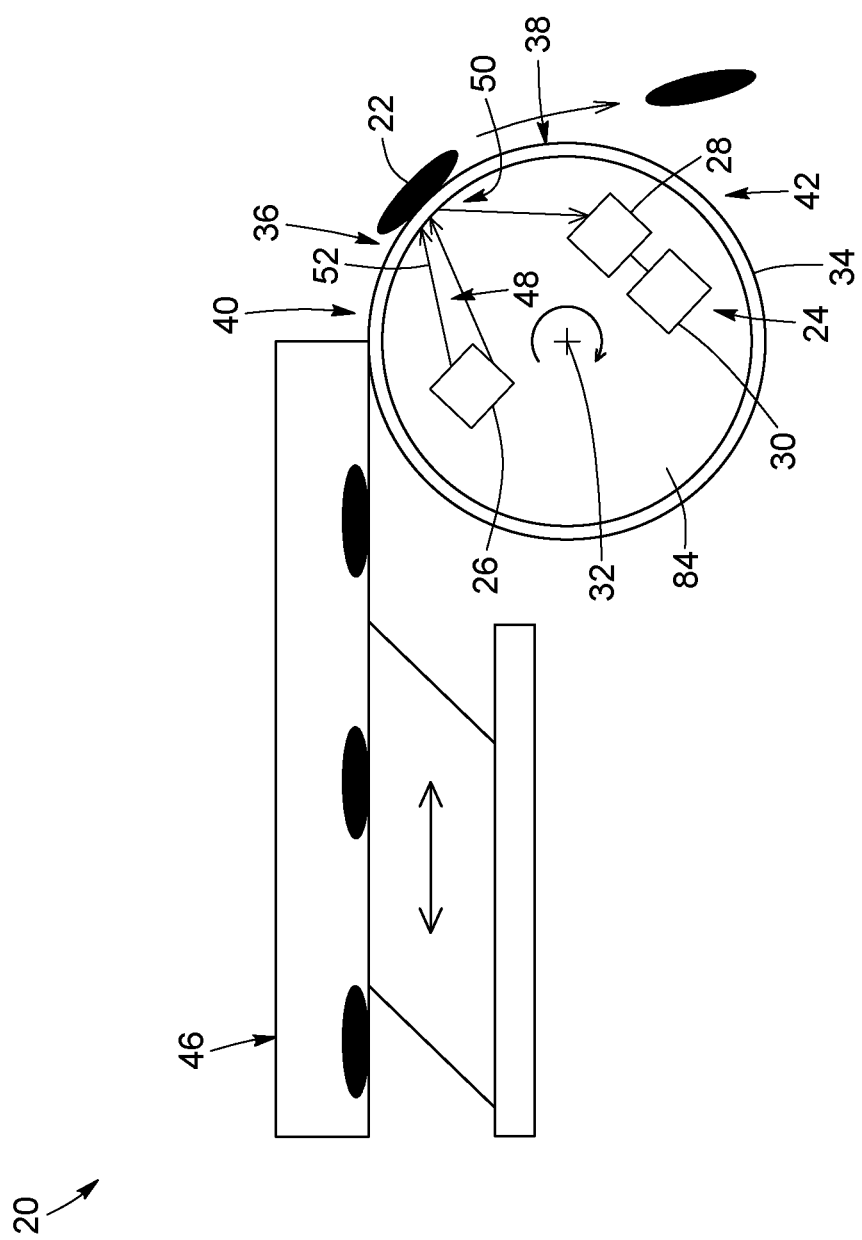

It is noted that a conveying roller with a hollow interior could also be employed in diffuse or specular reflection configurations, as illustrated in FIG. 4C. In such variants, both the illumination unit 26 and the spectral detection unit 28 would be provided in the cavity 84 defined by the hollow interior of the conveying roller 24. In such configurations, the spectral detection unit 28 would measure spectrally and/or diffusively reflected object light 54 produced by specular and/or diffuse reflection of the illumination light 48 by the objects 22 from "below" or "inside" the conveying surface 36.

Optical Sorting Implementations

As mentioned above, some implementations of the present techniques can be used in optical sorting applications that aim to separate, group, classify or divide objects based on a spectral identification of the objects. Such implementations are referred to herein as optical sorting" implementations.

Figure 5:
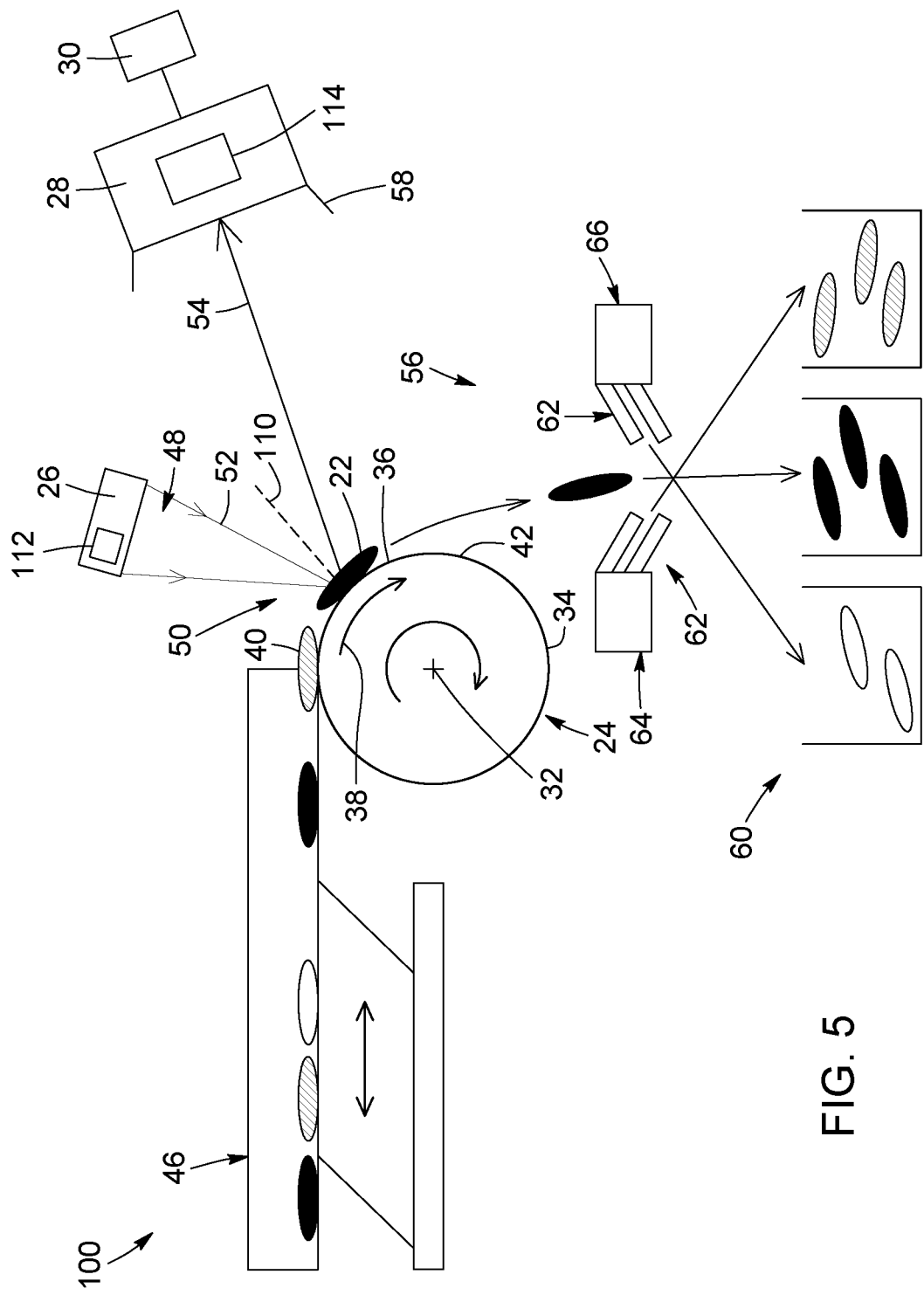
FIG. 5 is a schematic side view of an optical sorting system, according to an embodiment.

Referring to FIG. 5, there is illustrated an exemplary embodiment of an optical sorting system 100 for spectrally analyzing and sorting a flow of objects 22. The optical sorting system 100 depicted in FIG. 5 shares many features with the embodiments of the spectral identification system 20 described above and illustrated in FIGS. 1 to 4 in that it generally includes a rotatable conveying roller 24, an illumination unit 26, a spectral detection unit 28, and a processing unit 30. These and other components of the optical sorting system 100 of FIG. 5 can generally be similar in terms of structure and operation to like components described above with respect to the spectral identification system 20 of FIGS. 1 to 4, and they will not be described again in detail other than to highlight differences and additional features. In addition to spectral identification implementations, the optical sorting system 100 also includes a sorting unit 56 located at the discharge end 42 (i.e., close to the objects 22 falling from the conveying surface 36) and configured to sort the objects 22 discharged from the conveying roller 24 end based on the material identification data received from the processing unit 30. The sorting unit 56 receives material identification data from the processing unit 30 and sorts the flow of objects 22 based on the material identification data, for example as the objects fall by gravity from the conveying roller 24 at the discharge end 42 of the conveying path 38. More particularly, the sorting unit 56 is configured to divert a selected one of the objects 22 along a selected sorting path as the selected object 22 is free falling from the conveying surface 36 at the discharge end 42 of the conveying path 38.

The sorting unit 56 is operatively connected to the processing unit 30 such that material identification data may be transmitted from the processing unit 30 to the sorting unit 56 using a local or an external network, routers, cables, combinations thereof, or any other transmission device(s) allowing data transfer from the processing unit 30 to the sorting unit 56. The structure and operating principles of sorting units that sort falling objects is generally well known to one skilled in the art and need not be described herein.

Referring still to FIG. 5, the optical sorting system 100 can further include a plurality of sorting bins 60 configured for receiving the sorted objects 22. The sorting bins 60 can be embodied by any kind of box, frame, crib or enclosed space for storing the sorted objects 22. Three sorting bins 60 are illustrated in FIG. 5, but this number can be varied in other embodiments.

In some embodiments, the sorting unit 56 can include at least one air jet 62 for propelling pressurized air toward the objects 22 during their fall from the conveying surface 36 at the discharge end 42 of the conveying path 38. Two sets of air jets 62 are provided in the illustrated embodiment, although other embodiments can include any suitable number of air jets. Each air jet 62 selectively directs the falling objects 22 into one of the three sorting bins 60. Depending on the application, the number of sorting bins 60 may or may not be equal to the number of air jets 62. The air flow produced by the air jets 62 can be adjustable in pressure and/or orientation. Such adjustment capabilities may be useful when sorting objects having different sizes and/or compositions. For example, the embodiment of FIG. 5 includes a first set 64 of air jets 62 for directing the falling objects in a first one of the sorting bins 60 (right bin in FIG. 5) and a second set 66 of air jets 62 for directing the falling objects 22 in a second one of the sorting bins 60 (left bin in FIG. 5), which may be useful for sorting mixtures of materials (e.g., a flow of non-homogeneous objects 22). The pressure of the air jets 62 may be adjusted according to the targeted application or materials to be sorted. The combination of an appropriate pressure and angle may facilitate the sorting of the falling objects 22 after their disengagement from the conveying roller 24. It is to be noted that the sorting of the falling objects 22 may be facilitated by the controlled speed of the falling objects 22, as previously described. In this embodiment, objects 22 can be sent to the middle bin by turning off both sets 64, 66 of air jets 62.

In one example, the optical sorting system 100 may be used for sorting relatively small volumes of highly-contaminated plastics or materials that are typically difficult to sort. The flow of objects 22 to be sorted may be about between 10 kg/h and 1000 kg/h, for example 50 kg/h, and the materials may be polyethylene terephthalate (PET) and polyethylene terephthalate glycol-modified (PETG). Also, some optical sorting implementations can be useful for sorting a flow of non-homogeneous particles, such as a plastic/glass mixture or a mixture including different plastic materials.

Infrared Emitter-Detector Implementations

The techniques described above can be used, as previously mentioned, for material identification and discrimination using imaging spectroscopy, for example infrared spectroscopy. Such implementations can involve measuring a spectral response of an object to illumination light; performing an analysis of the measured spectral response to obtain material-specific spectral information or data associated with the object; and, for optical sorting implementations, sorting the object based on the material-specific spectral information or data. When operating in the infrared, the spectral measurement step may be carried out using an infrared emitter-detector assembly that embodies or defines the illumination unit and the spectral detection unit described above. The present description also relates to such an infrared emitter-detector assembly suitable for spectral identification in the MWIR region, as will now be described.

Figure 6:
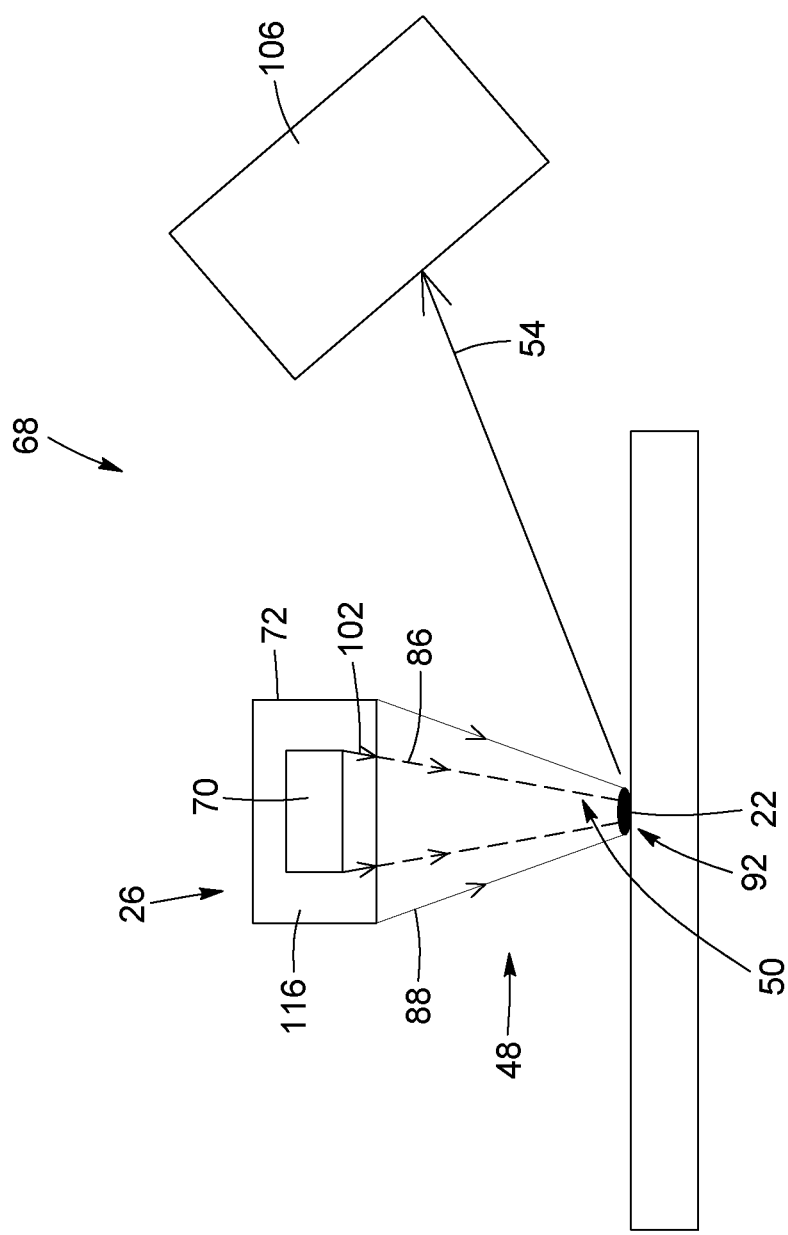
FIG. 6 is a schematic side view of an infrared emitter-detector assembly according to an embodiment.

Referring to FIG. 6, there is illustrated an exemplary embodiment of an infrared emitter-detector assembly 68 for characterizing a mid-wavelength infrared (MWIR) spectral response of an object 22 in an illumination zone 50. The infrared emitter-detector assembly 68 generally includes an illumination unit 26 and a MWIR detection unit 106, where the illumination unit 26 includes at least one blackbody-like source 70 having a given operating temperature, as described below.

In the present description, the term "blackbody" refers to an ideal infrared absorber and an ideal infrared emitter. A blackbody in thermal equilibrium emits electromagnetic radiation according to Planck's law, which entails that its emissivity spectrum is determined solely by its temperature. The term "blackbody-like" is intended to be broad enough to cover not only ideal or nearly ideal blackbodies, but also bodies whose emissivity as a function of wavelength is, for practical purposes, sufficiently close to that of an ideal blackbody. The following theoretical considerations are first introduced before presenting the infrared emitter-detector assembly 68 in greater detail.

Planck's law describes the spectral density of energy radiated by a blackbody in thermal equilibrium at a given temperature. Meanwhile, Wien's displacement law states that the spectral radiance of blackbody radiation per unit wavelength peaks at a wavelength $\lambda_{max}=b/T$, where T is the temperature (in kelvins) and b is the Wien's displacement constant, which is approximately equal to $2.898 \times 10^{-3}$ m·K. For example, the temperature at which $\lambda_{max}$ is equal to 3 μm (i.e., at the lower end of the MWIR region) is about 966 K. Indeed, the infrared emitter industry generally recommends using an emitter resistor heated to a temperature ranging between 800 and 1200 K for MWIR operation.

This means that a worker in the field that wishes to obtain infrared emission at 3 μm would be inclined to use an infrared emitter operating at a temperature whose value of $\lambda_{max}$ is equal or close to 3 μm. However, the Wien's displacement law only gives the wavelength $\lambda_{max}$ of maximum emission at a given temperature, not the temperature at which the radiated energy is maximum at this given wavelength. That is, an element heated to 1033 K ($\lambda_{max}$ 2.9 μm, which is close to 3 μm) typically emits about 20 times less power at 3 μm than an element heated to 2900 K ($\lambda_{max}$ 1 μm) and about 100 times less than an element heated to 3273 K ($\lambda_{max}$ 0.9 μm). The inventors have recognized that it would be more appropriate to select the temperature of an infrared emitter based on Planck's law to determine the amount of radiated intensity at the desired emission wavelength, rather than based on Wien's displacement law as favored by infrared emitter manufacturers.

Returning to the embodiment of FIG. 6, the blackbody-like source 70 of the illuminator unit 26 has an operating temperature of at least about 2000 K, which is significantly higher than the operating temperature of conventional thermal light sources used for MWIR and LWIR spectroscopy. The illumination unit 26 is configured to emit illumination light 48 upon the object 22 in the illumination zone 50. The illumination light 48 includes wavelengths lying in an illumination waveband ranging from about 2.5 µm to about 8 µm, more particularly between about 3 µm and about 8 µm. This spectral range of interest corresponds to a standard definition for the spectral band associated with the MWIR region. It is noted that according to Wien's displacement law, the wavelength λmax associated with a blackbody temperature of 2000 K is equal to 1.45 µm, which is well outside the MWIR region (2.5-8 µm). In some non-limiting embodiments, the operating temperature of the blackbody-like source 70 can range between about 2000 K and about 3500 K. For example, the operating temperature of the blackbody-like source 70 can be larger than 2100 K, or larger than 2200 K, or larger than 2300 K, or larger than 2400 K or larger than 2500 K, or larger than 2600 K, or larger than 2700 K, or larger than 2800 K or larger than 2900 K, or larger than 3000 K, or larger than 3100 K, or larger than 3200 K, or larger than 3300 K, or larger than 3400 K, or larger than 3500 K.

In some implementations, the illuminating unit 26 can include a cladding 72 surrounding at least partly, and in thermal contact with, the blackbody-like source 70. The cladding 72 is at least partially transparent to electromagnetic radiation in the spectral range of interest, so that the illumination light 48 can reach the object 22. More particularly, this means that the illumination light 48 reaching the object 22 includes the portion 86 of the light 102 emitted by the blackbody-like source 70 that the cladding 72 transmits, and, if any, the light 88 emitted by the cladding 72 itself, for example due to being heated by the blackbody-like source 70. As used herein, the term "thermal contact" generally means that heat transfer can occur, directly or indirectly, between two or more components. In some implementations, the illumination unit 26 can further include one or more spectral filters (not shown) around the blackbody-like source 70 and/or the cladding 72 to selectively tailor the spectrum of the illumination light 48.

Referring still to FIG. 6, the MWIR detection unit 106 has detection waveband encompassing the illumination waveband and configured to detect object light 54 emanating from the object 22 upon illumination by the illumination light 48. In some implementations, the MWIR detection unit 106 can be a hyperspectral imager, a multispectral imager or an infrared camera. The detected object light 54 conveys information associated with the MWIR spectral response or signature of the object 22 in the spectral range of interest. As mentioned above, spectral analysis of the detected object light 54 can yield material-specific information about the object 22. As also mentioned above, depending on the application, the object light 54 can be detected as specularly reflected light, diffusively reflected light and/or transmitted light.

Figure 7:
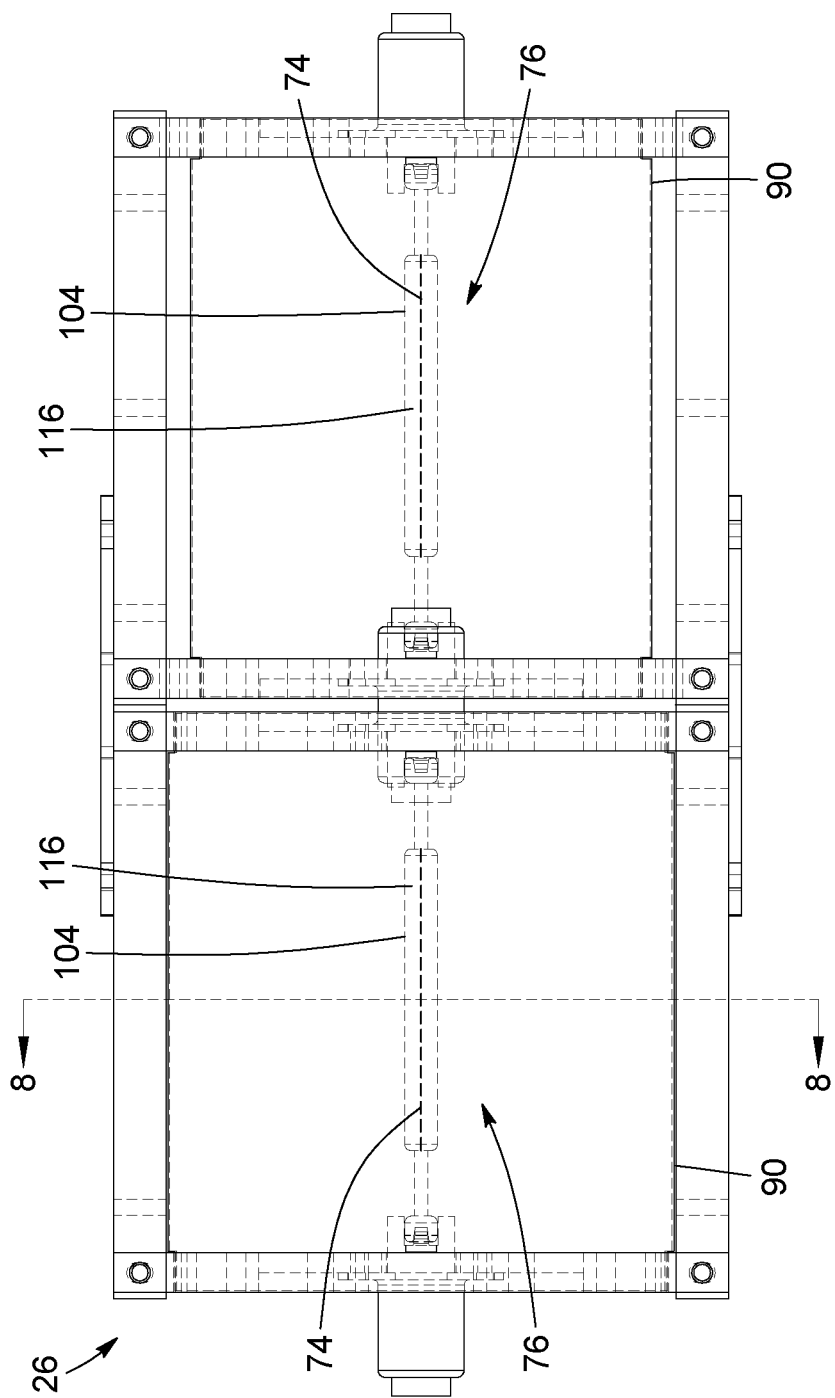
FIG. 7 is a bottom view of an illumination unit including a blackbody-like source.
Figure 8:
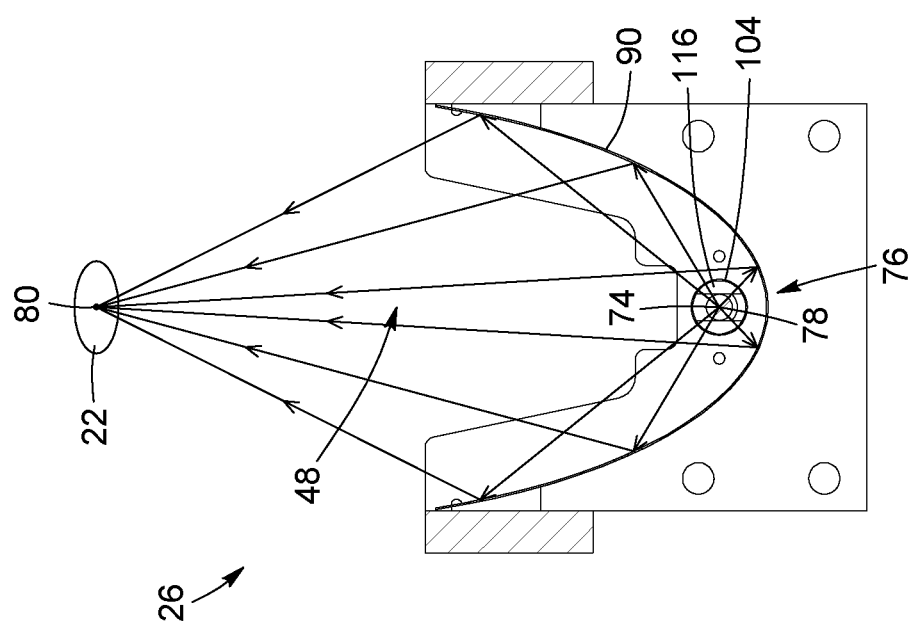
FIG. 8 is a cross-sectional view of the illumination unit of FIG. 7, taken along section line 8-8.

Turning now to FIGS. 7 and 8, there are shown two views of an example of an illumination unit 26 which can be used in an infrared emitter-detector assembly such as described above. In this example, the illumination unit 26 includes two halogen lamps 76. Each one of the halogen lamps 76 includes a heatable filament 74 (e.g., made of tungsten) embodying a blackbody-like source, and a bulb 104 (e.g., made of glass such as quartz) embodying a cladding. In this embodiment, the cladding or bulb 104 forms a hermetically sealed cavity 116 around the blackbody-like source or heatable filament 74, the hermetically sealed cavity 116 containing a fill gas including a halogen. In such implementations, the operating temperature of the heatable filaments 74 can be as high as 3273 K. However, in other implementations, the heatable filaments 74 may also be operated at other temperatures ranging from 2000 K and above.

It should be noted that although halogen lamps are commonly used for NIR spectroscopy, it appears that they are not used for MWIR spectroscopy. A reason for this may be that halogen lamps have high operating temperatures, which, as described above, would lead a worker in the field of infrared emitters to avoid their use for MWIR applications. Another reason may be that the bulb of a typical quartz tungsten halogen lamp significantly absorbs the filament light emitted by the heatable filament above 3.5 µm, that is, in the MWIR region. However, upon closer scrutiny, it has been recognized by the inventors that while the quartz bulb may indeed significantly absorb infrared radiation above 3.5 µm, this is generally not an issue in practice. This is because the quartz bulb is heated by the radiant energy emitted by the heatable filament, typically to a temperature of 900 K or more. As a result, the quartz bulb behaves as an infrared emitter that emits bulb or cladding light with an emissivity spectrum having a substantial contribution from wavelengths in the range from 3.3 to 10 µm ($\lambda_{max}$ 3.3 µm at 900 K), that is, in the illumination waveband forming the illumination light. This means that by using an illumination unit including one or more quartz tungsten halogen lamps, one can obtain illumination light in the range of about 1-10 µm, which encompasses the MWIR region (about 3-8 µm). In such implementations, the illumination light is made of the portion of the filament light that passes through the quartz bulb without being absorbed (about 1-3.5 µm; e.g., light 86 in FIG. 6), and of the bulb light emitted by the quartz bulb (about 3.3-10 µm; e.g., light 88 in FIG. 6).

Referring still to FIGS. 7 and 8, in addition to the temperature of the heatable filament 74, the positioning of the filament 74 with respect to the object 22 may be relevant and be adjustable from one application to another. More particularly, the position of each halogen lamp 76 with respect to the object 22 may be individually adjusted.

In some implementations, an optical reflector 90 may be disposed in the optical path between the halogen lamp 76 and the object 22 to receive and reflect the illumination light 48 toward the object 22. For example, in the illustrated embodiment, each halogen lamp 76 includes an elliptical reflector 90 optically coupled to the heatable filament 74. Other suitable types of reflectors (e.g., parabolic, spherical) can be used in other embodiments. The elliptical reflector 90 has a primary focus 78 substantially coincident with (i.e., located on or proximate to) the blackbody-like source 70, and a secondary focus 80 substantially coincident with (i.e., located on or proximate to) the illumination zone where the object 22 to be characterized is disposed. The elliptical reflector 90 is configured to receive the portion of illumination light 48 (or a substantial portion thereof) emitted by the associated halogen lamp 76 and to direct the portion of the illumination light 48 toward the object 22.

Returning to FIG. 6, in the illustrated embodiment, the object 22 is spectrally characterized by the infrared emitter-detector assembly 68 while it is at rest on a support defining a stationary surface 92. However, in other implementations, the infrared emitter-detector assembly 68 may also be used while the object or objects 22 are in movement on a support, as shown in the embodiments of FIGS. 9 to 11.

Figure 9:
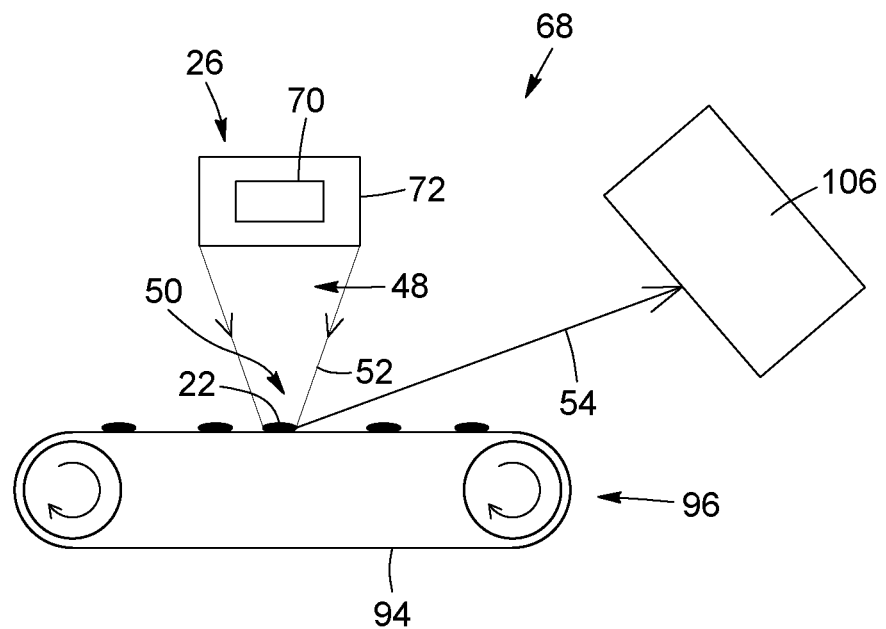
FIG. 9 is a schematic side view of an infrared emitter-detector assembly according to another embodiment.

Referring to FIG. 9, in one embodiment, the objects 22 to be spectrally characterized by the infrared emitter-detector assembly 68 are conveyed on a support embodied by a conveyor belt 94 of a belt conveyor 96. In this embodiment, the objects 22 are illuminated and their spectral response is detected as they are conveyed on and in contact with the conveyor belt 94.

Figure 10:
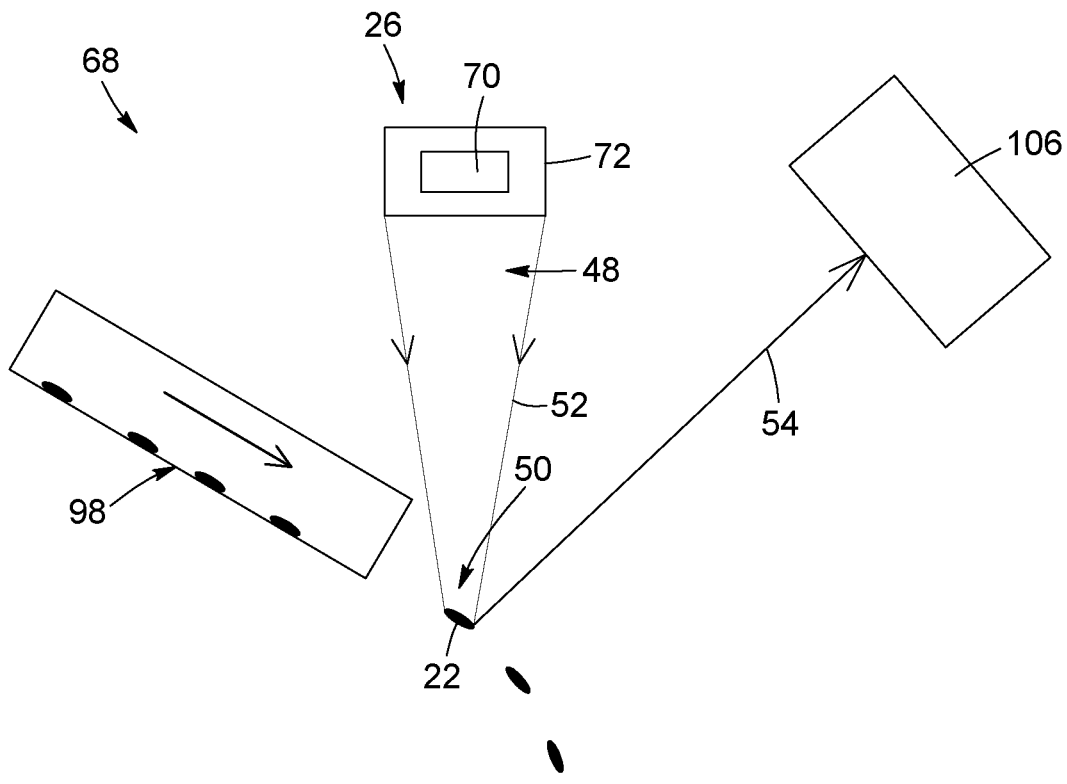
FIG. 10 is a schematic side view of an infrared emitter-detector assembly according to another embodiment.

Referring to FIG. 10, in another embodiment, the objects 22 to be spectrally characterized by the infrared emitter-detector assembly 68 are conveyed on a support embodied by an inclined plane of a chute 98. In this embodiment, the objects 22 are illuminated and their spectral response is detected as they are free falling from—and not in contact anymore with—the chute 98.

Figure 11:
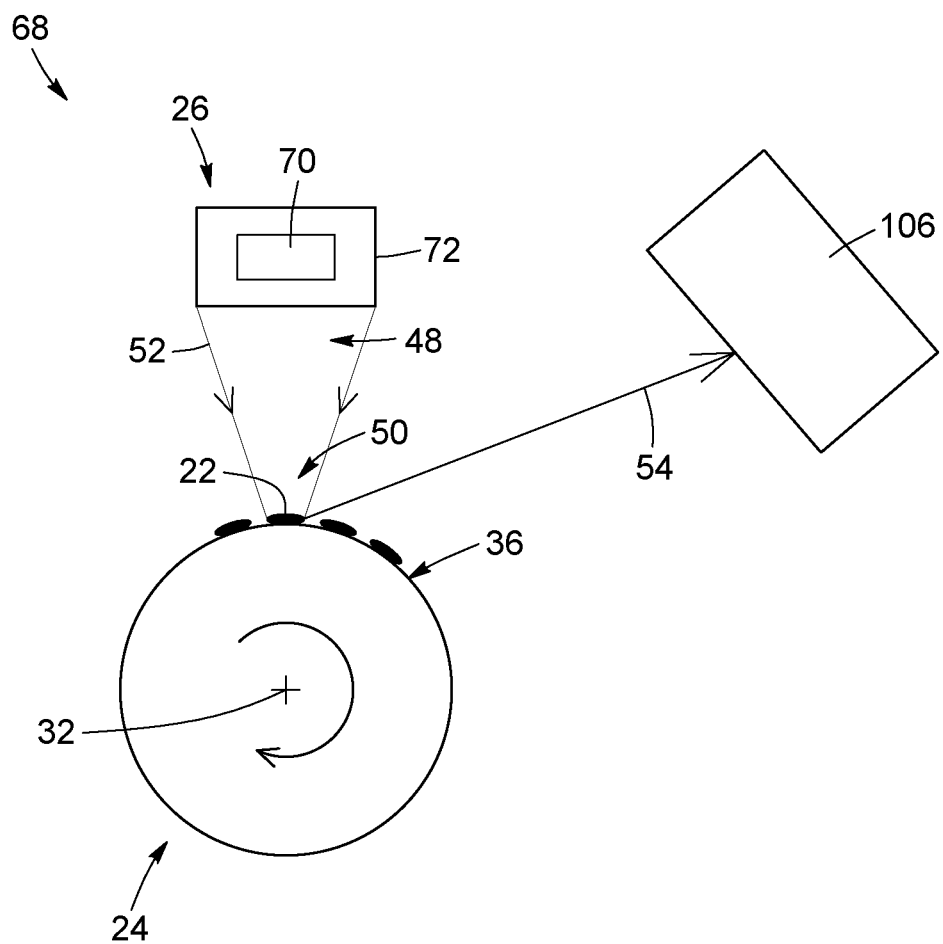
FIG. 11 is a schematic side view of an infrared emitter-detector assembly according to another embodiment.

Referring to FIG. 11, in yet another embodiment, the objects 22 to be spectrally characterized by the infrared emitter-detector assembly 68 are located on a support embodied by a conveying surface 36 of a conveying roller 24. In this embodiment, the objects 22 are illuminated and their spectral response is detected as they are conveyed on and in contact with the conveying surface 36. It will be understood that the infrared detector-emitter assembly 68 of FIG. 11 can be used in MWIR spectral identification and/or optical sorting implementations such as described above and illustrated in FIGS. 1 to 5.

It should be noted that each one of the embodiments of FIGS. 9 to 11 can be adapted to detect the object light 54 as specularly reflected light, diffusively reflected light and/or transmitted light, as described above with reference to FIGS. 2 to 4C.

Figure 12:
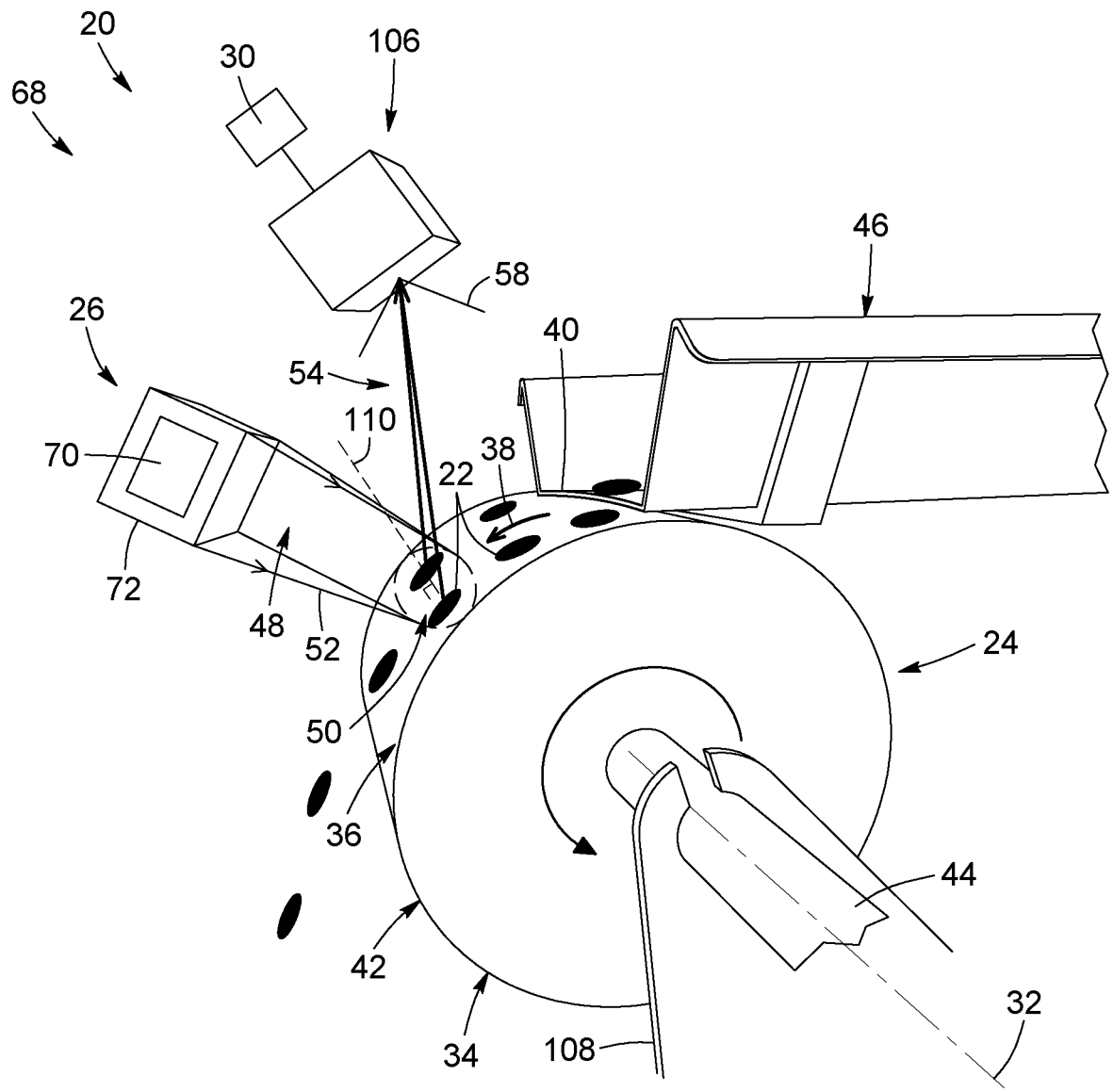
FIG. 12 is a schematic side view of a spectral identification system, according to another embodiment, where the illumination unit and the spectral detection unit are embodied by an infrared emitter-detector assembly.
Figure 13:
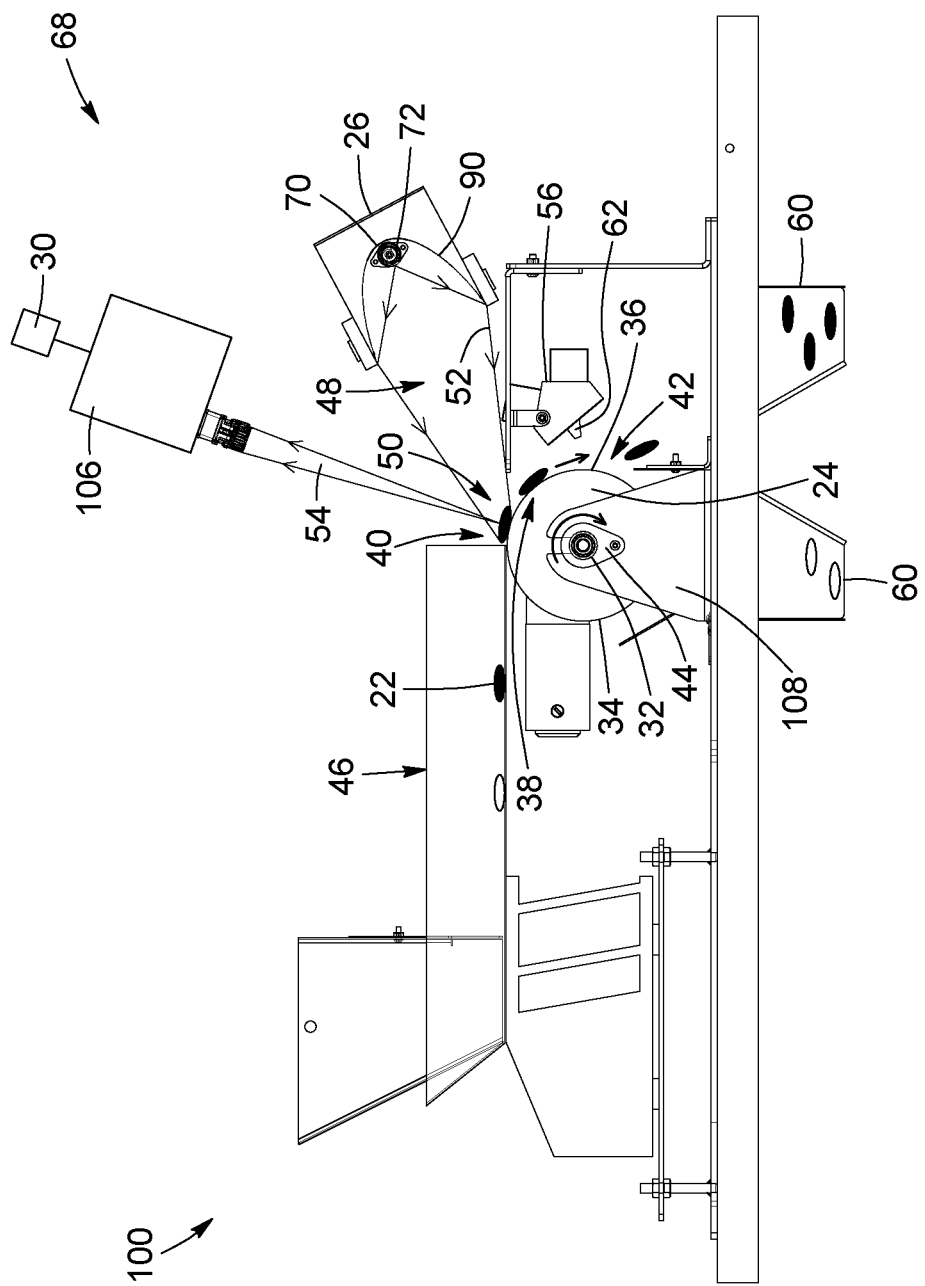
FIG. 13 is a schematic side view of an optical sorting system, according to another embodiment, where the illumination unit and the spectral detection unit are embodied by an infrared emitter-detector assembly.

Referring now to FIGS. 12 and 13, there are shown an embodiment of a spectral identification system 20 (FIG. 12) and an embodiment of an optical sorting system 100 (FIG. 13), each of which including a rotatable conveying roller 24, an illumination unit 26, a MWIR detection unit 106, a processing unit 30, and, in FIG. 13, a sorting unit 56. These components can generally be similar in terms of structure and operation to like components described above with respect to the spectral identification system 20 of FIGS. 1 to 5, and they need not be described again in detail. In both FIGS. 12 and 13, the illumination unit 26 and the MWIR detection unit 106 can form an infrared emitter-detector assembly 68 such as described above with reference to FIGS. 6 to 11. Such spectral identification and optical sorting implementations can be useful notably for identifying and sorting black and dark plastics using MWIR spectroscopy.

Methods Implementations

The present description also relates to a spectral identification method for spectrally analyzing a flow of objects as well as an optical sorting method for optically sorting a flow of objects. Such methods can be performed with spectral identification systems and optical sorting systems such as described above, or with other such systems.

Broadly described, both the spectral identification method and the optical sorting method can include a step of conveying the objects on a conveying surface along a conveying path that extends between a feed end and a discharge end. The conveying surface corresponds to an outer lateral periphery of a rotatable conveying roller. The conveying surface is also configured to support and transport the objects along the conveying path. In some implementations, the methods can include steps of supplying the objects to the conveying surface at the feed end of the conveying path and/or discharging the objects from the conveying roller by gravity at the discharge end of the conveying path.

Both methods can also include a step of projecting illumination light toward an illumination zone intersecting at least part of the conveying path to illuminate the flow of objects as the objects are conveyed on the conveying surface. For example, the projecting step can include emitting the illumination light in an illumination waveband comprising wavelengths ranging from about 0.2 micrometer to about 15 micrometers. The methods can also include a step of detecting object light emanating from the flow of objects in the illumination zone, and outputting spectral data representative of the detected object light. As mentioned above, depending on the application, the detecting step can include detecting the object light as specularly reflected light produced by specular reflection of the illumination light from the objects, and/or as diffusively reflected light produced by diffuse reflection of the illumination light from the objects, and/or as transmitted light produced by transmission of the illumination light through the objects and the conveying surface. The methods can further include a step of performing material identification in the flow of objects based on the spectral data. In addition, the optical sorting method can include a step of sorting the objects discharged from the conveying roller based on the material identification.

In accordance with another aspect, the present description also provides a method for measuring a mid-wavelength infrared (MWIR) spectral response of an object in an illumination zone. The method can be performed with an infrared emitter-detector assembly such as described above, or with another infrared emitter-detector assembly.

In one embodiment, the method can include a step of emitting illumination light upon the object in the illumination zone with an illumination unit comprising a blackbody-like source maintained at an operating temperature of at least about 2000 kelvins. The illumination light can include wavelengths lying in an illumination waveband ranging from about 3 micrometers to about 8 micrometers. The method can include providing the illumination unit as a halogen lamp having a heatable filament defining the blackbody-like source and a cladding enclosing the heatable filament and forming a hermetically sealed cavity containing a fill gas including a halogen. The method can also include reflecting the illumination light toward the object with an optical reflector, for example an elliptical reflector having a primary and a secondary focus. In such a case, the method can include comprising positioning the primary focus to coincide substantially with the blackbody-like source and the secondary focus to coincide with the object.

The method can also include a step of detecting object light emanating from the illuminated object in detection waveband encompassing the illumination waveband, the detected object light conveying information associated with the MWIR spectral response of the object. Depending on the application, the detecting step can include detecting the object light as specularly reflected light produced by specular reflection of the illumination light from the object, and/or as diffusively reflected light produced by diffuse reflection of the illumination light from the object, and/or as transmitted light produced by transmission of the illumination light through the object.

The method can be performed while the object is at rest in the illumination zone, or while the object is conveyed along a conveying path across or toward the illumination zone, for example on a conveying roller such as described above, or on another structure such as a conveyor belt or an inclined plane.

It is noted that in some implementations, the emitting and detecting steps of the MWIR spectral characterization method can be used as the projecting and detecting steps of the spectral identification method and/or the optical sorting method described above.

Of course, numerous modifications could be made to the embodiments described above without departing from the scope of the present disclosure.

The invention claimed is:

1. A spectral identification system for spectrally analyzing a flow of objects, the spectral identification system comprising:
   a conveying roller having a longitudinal rotation axis and an outer lateral periphery, the outer lateral periphery defining a conveying surface to support and transport the objects along a conveying path extending from a feed end to a discharge end thereof;
   an illumination unit configured to project illumination light toward an illumination zone intersecting at least part of the conveying path to illuminate the flow of objects on the conveying surface;
   a spectral detection unit configured to detect object light emanating from the flow of objects in the illumination zone upon illumination by the illumination light and output spectral data representative of the detected object light; and
   a processing unit configured to receive the spectral data output by the spectral detection unit and perform material identification in the flow of objects based on the spectral data,
   wherein the illumination unit is configured to emit the illumination light in an illumination waveband and the spectral detection unit comprises a detector configured to detect the object light in a detection waveband, the illumination waveband and the detection waveband both comprising wavelengths ranging from about 0.2 micrometer to about 15 micrometers.

2. The spectral identification system of claim 1, wherein the conveying roller has a cylindrical shape.

3. The spectral identification system of claim 1, wherein the conveying roller is made of polytetrafluoroethylene (PTFE), polyether ether ketone (PEEK), ultra-high-molecular-weight polyethylene (UHMW-PE), aluminum, or steel.

4. The spectral identification system of claim 1, wherein the outer lateral periphery has a surface normal that is perpendicular to the longitudinal rotation axis.

5. The spectral identification system of claim 1, wherein the objects are discharged from the conveying roller by gravity at the discharge end of the conveying path.

6. The spectral identification system of claim 1, wherein the illumination waveband and the detection waveband both comprise wavelengths ranging from about 0.4 micrometer to about 0.7 micrometer.

7. The spectral identification system of claim 1, wherein the illumination waveband and the detection waveband both comprise wavelengths ranging from about 0.9 micrometer to about 1.7 micrometers.

8. The spectral identification system of claim 1, wherein the illumination waveband and the detection waveband both comprise wavelengths ranging from about 1.3 micrometers to about 1.9 micrometers.

9. The spectral identification system of claim 1, wherein the illumination waveband and the detection waveband both comprise wavelengths ranging from about 3 micrometers to about 8 micrometers.

10. The spectral identification system of claim 9, wherein the illumination unit comprises a blackbody-like source having an operating temperature of at least about 2000 kelvins.

11. The spectral identification system of claim 10, wherein the illumination unit comprises a cladding surrounding at least partly the blackbody-like source.

12. The spectral identification system of claim 11, wherein the cladding is made of quartz.

13. The spectral identification system of claim 11, wherein the cladding is in thermal contact with and heated by the blackbody-like source to emit cladding light comprising wavelengths lying in at least part of the illumination waveband and forming part of the illumination light.

14. The spectral identification system of claim 11, wherein the cladding forms a hermetically sealed cavity around the blackbody-like source, the hermetically sealed cavity containing a fill gas comprising a halogen.

15. The spectral identification system of claim 10, wherein the blackbody-like source is a heatable filament.

16. The spectral identification system of claim 15, wherein the heatable filament is made of tungsten.

17. The spectral identification system of claim 10, wherein the operating temperature of the blackbody-like source ranges between about 2000 kelvins and about 3500 kelvins.

18. The spectral identification system of claim 10, wherein the illumination unit comprises an optical reflector positioned to receive and reflect the illumination light toward the object.

19. The spectral identification system of claim 18, wherein the optical reflector is an elliptical reflector.

20. The spectral identification system of claim 19, wherein the elliptical reflector has a primary focus substantially coincident with the blackbody-like source and a second focus substantially coincident with the illumination zone.

21. The spectral identification system of claim 1, wherein the illumination unit comprises a single optical source.

22. The spectral identification system of claim 1, wherein the illumination unit comprises a plurality of optical sources, each optical source producing a respective portion of the illumination light.

23. The spectral identification system of claim 1, wherein the illumination unit comprises a solid-state optical source, an incandescent optical source, a fluorescent optical source, a discharge optical source, or a combination thereof.

24. The spectral identification system of claim 1, wherein the spectral detection unit comprises at least one of a hyperspectral imager and a multispectral imager.

25. The spectral identification system of claim 1, wherein the spectral detection unit is configured to detect the object light as specularly reflected light produced by specular reflection of the illumination light from the objects.

26. The spectral identification system of claim 1, wherein the spectral detection unit is configured to detect the object light as diffusively reflected light produced by diffuse reflection of the illumination light from the objects.

27. The spectral identification system of claim 1, wherein the conveying roller has a hollow interior defining a cavity sized and shaped to accommodate therein at least one of the illumination unit and the spectral detection unit.

28. The spectral identification system of claim 1, wherein the illumination unit and spectral detection unit are provided respectively inside and outside the conveying roller, and the spectral detection unit is configured to detect the object light as transmitted light produced by transmission of the illumination light through the flow of objects and the conveying surface.

29. The spectral identification system of claim 1, further comprising an input feeder located at or proximate the feed end of the conveying path to supply the flow of objects to the conveying surface.

30. The spectral identification system of claim 29, wherein the input feeder comprises a vibrating table.

31. An optical sorting system for optically sorting a flow of objects, the optical sorting system comprising:
a spectral identification system according to claim 1; and
a sorting unit configured to sort the objects discharged from the conveying roller end based on material identification data received from the processing unit.

32. The optical sorting system of claim 31, wherein the sorting unit is configured to sort the objects as they fall by gravity from the conveying roller at the discharge end of the conveying path.

33. The optical sorting system of claim 32, wherein the sorting unit is configured to divert a selected one of the objects along a selected sorting path as the selected object is free falling from the conveying surface at the discharge end of the conveying path.

34. The optical sorting system of claim 33, wherein the sorting unit comprises at least one air jet configured to propel pressurized air toward the selected object.

35. The optical sorting system of claim 33, wherein the selected sorting path leads to one of a plurality of sorting bins configured to receive the sorted objects.

36. A spectral identification method for spectrally analyzing a flow of objects, the spectral identification method comprising:
conveying the objects on a conveying surface along a conveying path extending between a feed end and a discharge end thereof, the conveying surface corresponding to an outer lateral periphery of a conveying roller;
projecting illumination light toward an illumination zone intersecting at least part of the conveying path to illuminate the flow of objects as the objects are conveyed on the conveying surface;
detecting object light emanating from the flow of objects in the illumination zone, and outputting spectral data representative of the detected object light; and
performing material identification in the flow of objects based on the spectral data,
wherein the projecting step comprises emitting the illumination light in an illumination waveband and the detecting step comprises detecting the object light in a detection waveband, the illumination waveband and the detection waveband both comprising wavelengths ranging from about 0.2 micrometer to about 15 micrometers.

37. The spectral identification method of claim 36, further comprising supplying the objects to the conveying surface at the feed end of the conveying path.

38. The spectral identification method of claim 36, further comprising discharging the objects from the conveying roller by gravity at the discharge end of the conveying path.

39. The spectral identification method of claim 36, wherein the conveying step comprises conveying the objects at a conveying speed ranging from about 0.1 meter per second to about 1.5 meters per second.

40. The spectral identification method of claim 36, wherein the illumination waveband and the detection waveband both comprise wavelengths ranging from about 0.4 micrometer to about 0.7 micrometer.

41. The spectral identification method of claim 36, wherein the illumination waveband and the detection waveband both comprise wavelengths ranging from about 0.9 micrometer to about 1.7 micrometers.

42. The spectral identification method of claim 36, wherein the illumination waveband and the detection waveband both comprise wavelengths ranging from about 1.3 micrometers to about 1.9 micrometers.

43. The spectral identification method of claim 36, wherein the illumination waveband and the detection waveband both comprise wavelengths ranging from about 3 micrometers to about 8 micrometers.

44. The spectral identification method of claim 43, wherein the projecting step comprises providing an illumination unit as a halogen lamp comprising a heatable filament having an operating temperature of at least about 2000 kelvins and a cladding enclosing the heatable filament and forming a hermetically sealed cavity containing a fill gas comprising a halogen.

45. The spectral identification method of claim 44, wherein the cladding is made of quartz.

46. The spectral identification method of claim 44, wherein the heatable filament is made of tungsten.

47. The spectral identification method of claim 44, further comprising reflecting the illumination light toward the object with an optical reflector.

48. The spectral identification method of claim 47, wherein the optical reflector is an elliptical reflector having a primary focus and a secondary focus, the method comprising positioning the primary focus to coincide substantially with a blackbody-like source and the secondary focus to coincide with the object.

49. The spectral identification method of claim 44, further comprising maintaining the operating temperature of the heatable filament between about 2000 kelvins and about 3500 kelvins.

50. The spectral identification method of claim 36, wherein the projecting step comprises emitting the illumination light with a single optical source.

51. The spectral identification method of claim 36, wherein the projecting step comprises emitting the illumination light with a plurality of optical sources.

52. The spectral identification method of claim 36, wherein the detecting step comprises detecting the object light as specularly reflected light produced by specular reflection of the illumination light from the objects.

53. The spectral identification method of claim 36, wherein the detecting step comprises detecting the object light as diffusively reflected light produced by diffuse reflection of the illumination light from the objects.

54. The spectral identification method of claim 36, wherein the detecting step comprises detecting the object light as transmitted light produced by transmission of the illumination light through the objects and the conveying surface.

55. The spectral identification method of claim 36, wherein the performing step comprises:
identifying, in the spectral data, a measured spectral signature associated with the flow of objects;
providing a library containing a plurality of reference spectral signatures associated with a respective plurality of material properties;
accessing the library and finding a match between the measured spectral signature and a corresponding one of the reference spectral signatures stored in the library; and
assigning to the flow of objects the respective one of the material properties associated with the corresponding one of the reference spectral signatures.

56. The spectral identification method of claim 36, wherein the objects comprise metals, alloys, semiconductors, plastics, ceramics, glasses, organic materials, or a mixture thereof.

57. The spectral identification method of claim 36, wherein the objects comprise a mixture of plastic materials.

58. The spectral identification method of claim 36, wherein the objects comprise a mixture of plastic and glass materials.

59. The spectral identification method of claim 36, wherein the objects comprise white and/or lightly colored objects.

60. The spectral identification method of claim 36, wherein the objects comprise black and/or darkly colored objects.

61. The spectral identification method of claim 36, wherein the objects have a characteristic size ranging from about 0.2 millimeter to about 50 millimeters.

62. The spectral identification method of claim 61, wherein the characteristic size ranges from about 2 millimeters to about 25 millimeters.

63. An optical sorting method for optically sorting a flow of objects, the optical sorting method comprising:
performing a spectral identification method according to claim 36; and
sorting the objects discharged from the conveying roller based on the material identification.

64. The optical sorting method of claim 63, wherein the sorting step comprises sorting the objects at a sorting rate ranging from about 10 kilograms per hour to about 1000 kilograms per hour.

65. The optical sorting method of claim 63, wherein the sorting step comprises sorting the objects as they fall by gravity from the conveying roller at the discharge end of the conveying path.

66. The optical sorting method of claim 65, wherein the sorting step comprises diverting a selected one of the objects along a selected sorting path as the selected object is free falling from the conveying surface at the discharge end of the conveying path.

67. The optical sorting method of claim 66, wherein the sorting step comprises propelling pressurized air toward the selected object.

68. The optical sorting method of claim 66, wherein the sorting step comprises directing the selected object into one of a plurality of sorting bins.

69. An infrared emitter-detector assembly for measuring a mid-wavelength infrared (MWIR) spectral response of an object in an illumination zone, the infrared emitter-detector assembly comprising:
a conveying roller having a longitudinal rotation axis and an outer lateral periphery, the outer lateral periphery defining a conveying surface to support and transport the object in the illumination zone along a conveying path extending from a feed end to a discharge end thereof;
an illumination unit comprising a blackbody-like source having an operating temperature of at least about 2000 kelvins, the illumination unit being configured to emit illumination light upon the object in the illumination zone, the illumination light comprising wavelengths lying in an illumination waveband ranging from about 2.5 micrometers to about 8 micrometers; and
a MWIR detection unit having a detection waveband encompassing the illumination waveband and configured to detect object light emanating from the object in the illumination zone upon illumination by the illumination light, the detected object light conveying information associated with the MWIR spectral response of the object.

70. The infrared emitter-detector assembly of claim 69, wherein the illumination waveband ranges from about 3 micrometers to about 8 micrometers.

71. The infrared emitter-detector assembly of claim 69, wherein the illumination unit comprises a cladding surrounding at least partly the blackbody-like source.

72. The infrared emitter-detector assembly of claim 71, wherein the cladding is made of quartz.

73. The infrared emitter-detector assembly of claim 71, wherein the cladding is in thermal contact with and heated by the blackbody-like source to emit cladding light comprising wavelengths lying in at least part of the illumination waveband and forming part of the illumination light.

74. The infrared emitter-detector assembly of claim 71, wherein the cladding forms a hermetically sealed cavity around the blackbody-like source, the hermetically sealed cavity containing a fill gas comprising a halogen.

75. The infrared emitter-detector assembly of claim 69, wherein the blackbody-like source is a heatable filament.

76. The infrared emitter-detector assembly of claim 75, wherein the heatable filament is made of tungsten.

77. The infrared emitter-detector assembly of claim 69, wherein the operating temperature of the blackbody-like source ranges between about 2000 kelvins and about 3500 kelvins.

78. The infrared emitter-detector assembly of claim 69, wherein the illumination unit comprises an optical reflector positioned to receive and reflect the illumination light toward the object.

79. The infrared emitter-detector assembly of claim 78, wherein the optical reflector is an elliptical reflector.

80. The infrared emitter-detector assembly of claim 79, wherein the elliptical reflector has a primary focus substantially coincident with the blackbody-like source and a second focus substantially coincident with the illumination zone.

81. The infrared emitter-detector assembly of claim 69, wherein the MWIR detection unit is a hyperspectral imager or a multispectral imager.

82. The infrared emitter-detector assembly of claim 69, wherein the MWIR detection unit is configured to detect the object light as specularly reflected light produced by specular reflection of the illumination light from the object.

83. The infrared emitter-detector assembly of claim 69, wherein the MWIR detection unit is configured to detect the object light as diffusively reflected light produced by diffuse reflection of the illumination light from the object.

84. The infrared emitter-detector assembly of claim 69, wherein the MWIR detection unit is configured to detect the object light as transmitted light produced by transmission of the illumination light through the object.

85. The infrared emitter-detector assembly of claim 69, further comprising a support for supporting the object in the illumination zone.

86. A method for measuring a mid-wavelength infrared (MWIR) spectral response of an object in an illumination zone, the method comprising:
conveying the object on a conveying roller, the conveying roller having a longitudinal rotation axis and an outer lateral periphery, the outer lateral periphery defining a conveying surface to support and transport the object along a conveying path crossing the illumination zone and extending from a feed end to a discharge end thereof;
emitting illumination light upon the object in the illumination zone with an illumination unit comprising a blackbody-like source maintained at an operating temperature of at least about 2000 kelvins, the illumination light comprising wavelengths lying in an illumination waveband ranging from about 2.5 micrometers to about 8 micrometers; and detecting object light emanating from the illuminated object in detection waveband encompassing the illumination waveband, the detected object light conveying information associated with the MWIR spectral response of the object.

87. The method of claim 86, wherein the illumination waveband ranges from about 3 micrometers to about 8 micrometers.

88. The method of claim 86, further comprising providing the illumination unit as a halogen lamp comprising a heatable filament defining the blackbody-like source and a cladding enclosing the heatable filament and forming a hermetically sealed cavity containing a fill gas comprising a halogen.

89. The method of claim 88, wherein the cladding is made of quartz.

90. The method of claim 88, wherein the heatable filament is made of tungsten.

91. The method of claim 86, further comprising reflecting the illumination light toward the object with an optical reflector.

92. The method of claim 91, wherein the optical reflector is an elliptical reflector having a primary focus and a secondary focus, the method comprising positioning the primary focus to coincide substantially with the blackbody-like source and the secondary focus to coincide with the object.

93. The method of claim 86 further comprising maintaining the operating temperature of the blackbody-like source between about 2000 kelvins and about 3500 kelvins.

94. The method of claim 86, further comprising maintaining the operating temperature of the blackbody-like source higher than 2100 kelvins, or higher than 2200 kelvins, or higher than 2300 kelvins, or higher than 2400 kelvins, or higher than 2500 kelvins, or higher than 2600 kelvins, or higher than 2700 kelvins, or higher than 2800 kelvins, or higher than 2900 kelvins, or higher than 3000 kelvins, or higher than 3100 kelvins, or higher than 3200 kelvins, or higher than 3300 kelvins, or higher than 3400 kelvins, or higher than 3500 kelvins.

95. The method of claim 86, wherein the detecting step comprises detecting the object light as specularly reflected light produced by specular reflection of the illumination light from the object.

96. The method of claim 86, wherein the detecting step comprises detecting the object light as diffusively reflected light produced by diffuse reflection of the illumination light from the object.

97. The method of claim 86, wherein the detecting step comprises detecting the object light as transmitted light produced by transmission of the illumination light through the object.

* * * * *